United States Patent
Kumagai

(10) Patent No.: US 11,087,120 B2
(45) Date of Patent: Aug. 10, 2021

(54) IMAGE AUTHENTICATION DEVICE, IMAGE AUTHENTICATION METHOD, AND AUTOMOBILE

(71) Applicant: Mitsubishi Electric Corporation, Tokyo (JP)

(72) Inventor: Taro Kumagai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 129 days.

(21) Appl. No.: 16/343,935

(22) PCT Filed: Dec. 20, 2016

(86) PCT No.: PCT/JP2016/087933
§ 371 (c)(1),
(2) Date: Apr. 22, 2019

(87) PCT Pub. No.: WO2018/116373
PCT Pub. Date: Jun. 28, 2018

(65) Prior Publication Data
US 2021/0174065 A1     Jun. 10, 2021

(51) Int. Cl.
*G06K 9/00* (2006.01)
*B60N 2/00* (2006.01)
(Continued)

(52) U.S. Cl.
CPC ......... *G06K 9/00288* (2013.01); *B60N 2/002* (2013.01); *B60Q 9/00* (2013.01);
(Continued)

(58) Field of Classification Search
CPC ........... G06K 9/00288; G06K 9/00228; G06K 9/00838; G06T 7/70; B60N 2/002; B60Q 9/00
(Continued)

(56) References Cited

U.S. PATENT DOCUMENTS

2010/0232658 A1     9/2010 Omoto et al.

FOREIGN PATENT DOCUMENTS

| JP | 2001-60095 A  | 3/2001  |
| JP | 2006-306191 A | 11/2006 |

(Continued)

OTHER PUBLICATIONS

Office Action issued in corresponding Japanese Application No. 2018-557266 dated Mar. 17, 2020.
(Continued)

*Primary Examiner* — Stephen P Coleman
(74) *Attorney, Agent, or Firm* — Birch, Stewart, Kolasch & Birch, LLP

(57) ABSTRACT

An area determining unit (3) for determining whether a detected face area is located within an area set for authenticating an occupant sitting on a front seat of a vehicle, a face orientation detecting unit (4) for detecting orientation of a face of a person on the basis of position information in a taken image of an element of the face of the person detected when the face area is determined to be located within the set area, a face orientation determining unit (5) for determining whether the orientation of the face of the person detected is within a range of the face orientation set for authenticating the occupant sitting on the front seat of the vehicle, and an authentication processing unit (6) for collating characteristic information of the taken image of the face area with characteristic information of a taken image for authentication accumulated in advance and authenticating the person whose face area is detected when the orientation of the face of the person is determined to be within the set range of the face orientation.

13 Claims, 15 Drawing Sheets

(51) Int. Cl.
*B60Q 9/00* (2006.01)
*G06T 7/70* (2017.01)

(52) U.S. Cl.
CPC ..... *G06K 9/00228* (2013.01); *G06K 9/00838* (2013.01); *G06T 7/70* (2017.01); *G06T 2207/30201* (2013.01); *G06T 2207/30268* (2013.01)

(58) Field of Classification Search
USPC ....................................................... 382/103
See application file for complete search history.

(56) References Cited

FOREIGN PATENT DOCUMENTS

| | | |
|---|---|---|
| JP | 2007-308069 A | 11/2007 |
| JP | 2008-191743 A | 8/2008 |
| JP | 2010-213749 A | 9/2010 |
| JP | 2014-197353 A | 10/2014 |
| JP | 2015-71319 A | 4/2015 |
| JP | 2015-115028 A | 6/2015 |

OTHER PUBLICATIONS

International Search Report (PCT/ISA/210) issued in PCT/JP2016/087933, dated Mar. 28, 2017.

IMAGE AUTHENTICATION DEVICE, IMAGE AUTHENTICATION METHOD, AND AUTOMOBILE

TECHNICAL FIELD

The present invention relates to a technology mounted on a vehicle for authenticating an occupant of the vehicle.

BACKGROUND ART

There is a system of imaging an occupant sitting on a driver seat of a vehicle or occupants sitting on the driver seat and a passenger seat, performing face authentication of the occupant, for example, using a taken image, and providing a service suitable for the authenticated occupant.

As a system of performing the face authentication for the occupant sitting on the driver seat, for example, Patent Literature 1 discloses a driver specifying system in which when a trigger occurs; for example, when sitting on the driver seat of the vehicle is detected by a sitting sensor, when a door of the vehicle is locked, when the door of the vehicle is closed, when a seat belt of the driver seat of the vehicle is fastened, when the vehicle starts traveling, or when the vehicle stops, an in-vehicle camera obtains a taken image of a face of a driver, and the obtained taken image is used for face authentication of the driver.

In addition, in the case of performing the face authentication of the occupants sitting on the driver seat and the passenger seat in the driver specifying system disclosed in Patent Literature 1, a plurality of in-vehicle cameras including the in-vehicle camera for taking an image of the occupant on the driver seat and the in-vehicle camera for taking an image of the occupant on the passenger seat are prepared, or a single wide-angle camera capable of taking an image of the driver seat and the passenger seat is used to take an image of the occupants on the driver seat and the passenger seat.

CITATION LIST

Patent Literatures

Patent Literature 1: JP 2015-71319 A

SUMMARY OF INVENTION

Technical Problem

In the technology disclosed in Patent Literature 1 described above, the taken image of the face of the occupant is obtained after the trigger such as the detection by the sitting sensor occurs, so that when the occupants sitting on the driver seat and the passenger seat are imaged by respective different cameras, erroneous authentication to authenticate an image of a person other than the occupants does not occur frequently. However, in the technology disclosed in Patent Literature 1 described above, when the occupant on the driver seat and the occupant on the passenger seat are imaged with one camera, an occupant sitting on a rear seat or a person near a window and outside the vehicle is taken in the image, and there is a problem that authentication based on the image including the occupant or the person imaged is performed and thus the erroneous authentication occurs.

The present invention is achieved to solve the above-described problem, and an object thereof is to inhibit occurrence of the erroneous authentication in which an authenticating process is performed for the person other than the occupants to be authenticated, in the taken image of an imaging range in which the occupants sitting on the driver seat and the passenger seat can be simultaneously imaged.

Solution to Problem

An image authentication device according to the present invention is provided with: a processor to execute a program; and a memory to store the program which, when executed by the processor, performs processes, the processes including: detecting a face area in which a face of a person is located and characteristic information of the face area from a taken image in which an imaging range in which an occupant sitting on a driver seat and an occupant sitting on a passenger seat in a vehicle are able to be simultaneously imaged is imaged; detecting an element of the face of the person from the taken image of the face area detected; determining whether the face area detected is located within an area set partially in the imaging range for authenticating each of the occupants sitting on a front seat of the vehicle; and when it is determined that the face area is located within the set area, collating the characteristic information of the taken image of the face area with characteristic information of a taken image for authentication accumulated in advance and authenticating the person whose face area is detected.

Advantageous Effects of Invention

According to the present invention, it is possible to inhibit occurrence of the erroneous authentication in which an authenticating process is performed for the person other than the occupants to be authenticated in the taken image of an imaging range in which the occupants sitting on the driver seat and the passenger seat can be simultaneously imaged.

DESCRIPTION OF EMBODIMENTS

A mode for carrying out the present invention is hereinafter described with reference to the attached drawings in order to describe the present invention in further detail.

First Embodiment

Figure 1:
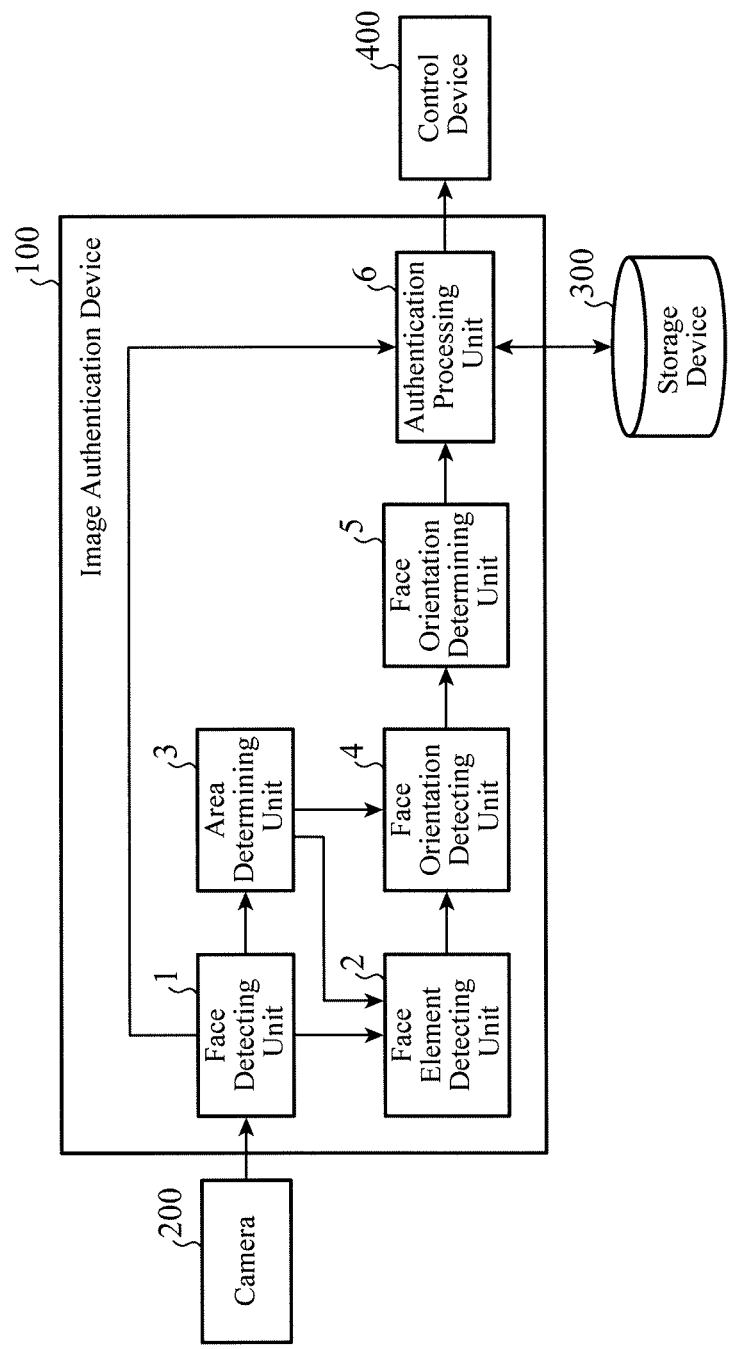
FIG. 1 is a block diagram illustrating a configuration of an image authentication device according to a first embodiment.

FIG. 1 is a block diagram illustrating a configuration of an image authentication device 100 according to a first embodiment.

The image authentication device 100 is provided with a face detecting unit 1, a face element detecting unit 2, an area determining unit 3, a face orientation detecting unit 4, a face orientation determining unit 5, and an authentication processing unit 6. Also, the image authentication device 100 is connected to a camera 200, a storage device 300, and a control device 400.

In addition to the configuration illustrated in FIG. 1, it is also possible to configure so that the image authentication device 100 is provided with at least one of the camera 200 and the storage device 300.

Figure 2:
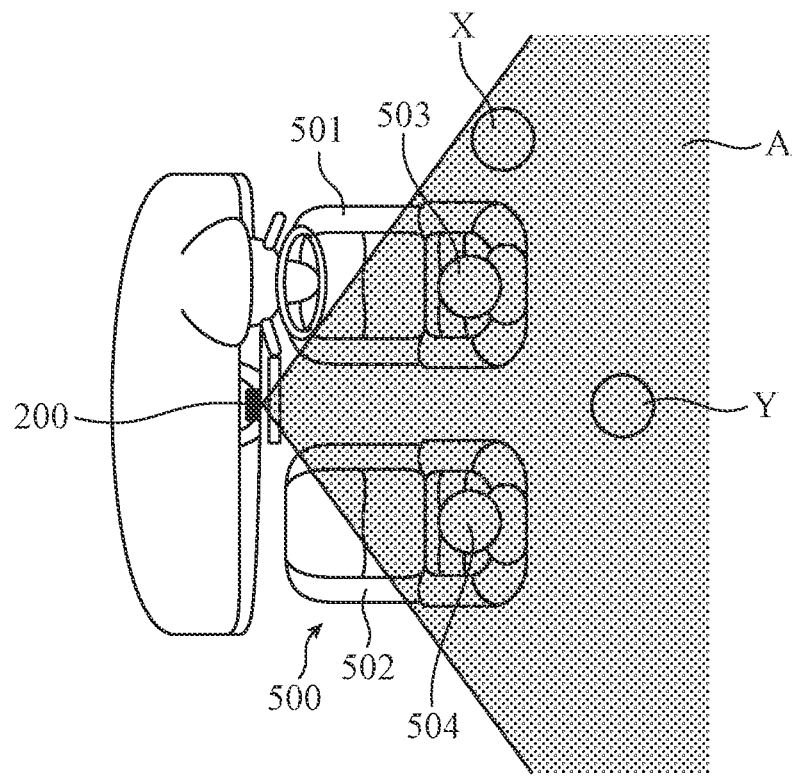
FIG. 2 is a view of an interior of a vehicle equipped with the image authentication device according to the first embodiment as seen from above.

FIG. 2 is a view of an interior of a vehicle 500 equipped with the image authentication device 100 as seen from above.

The camera 200 is formed of, for example, a wide-angle camera or the like, and is arranged in a position where at least occupants 503 and 504 sitting on a driver seat 501 and a passenger seat 502, respectively, can be imaged at the same time. An image taken by the camera 200 is input to the face detecting unit 1 of the image authentication device 100. In an example in FIG. 2, an imaging range of the camera 200 is indicated by an area A. In the area A, in addition to the occupants 503 and 504 sitting on the driver seat 501 and the passenger seat 502, respectively, there are persons X and Y who are not subject to authentication. Hereinafter, a configuration of suppressing the image authentication device 100 from authenticating the persons X and Y using the taken image of the persons X and Y is described.

The face detecting unit 1 analyzes the taken image input from the camera 200 and detects an area (hereinafter referred to as a face area) in which a face of a person is taken and characteristic information of the taken image of the face area. The face detecting unit 1 sets a rectangle surrounding the face area on the taken image and obtains coordinate values of vertices of the set rectangle. The coordinate values obtained by the face detecting unit 1 are the coordinate values in the taken image. The face detecting unit 1 outputs the obtained characteristic information and coordinate values of the taken image of the face area to the face element detecting unit 2 and the authentication processing unit 6. The face detecting unit 1 outputs the obtained coordinate values of the face area to the area determining unit 3. Herein, the characteristic information of the taken image is, for example, contrast values of portions of eyes, a nose, a mouth, and cheeks after normalizing a size of the face and the like.

The face element detecting unit 2 detects an element (hereinafter referred to as a face element) forming the face of the person within the face area input from the face detecting unit 1. The face element is, for example, the eyes, nose, mouth, ears, hairstyle and the like. The face element detecting unit 2 obtains the coordinate values of the area in which the detected face element is taken from the coordinate values of the face area input from the face detecting unit 1. The coordinate values obtained by the face element detecting unit 2 are also the coordinate values in the taken image. The face element detecting unit 2 may obtain the coordinate values of an entire area in which each face element is drawn or only the coordinate values of a contour of the area in which each element is drawn. The face element detecting unit 2 outputs the coordinate values of the detected face element to the face orientation detecting unit 4.

The area determining unit 3 determines whether the coordinate values of the face area input from the face detecting unit 1 are located within an area set in advance for authenticating an occupant sitting on a front seat of the vehicle. Herein, the front seat of the vehicle is at least one of the driver seat and the passenger seat of the vehicle. The area determining unit 3 performs area determination so as to be able to authenticate both a person sitting on the driver seat and a person sitting on the passenger seat of the vehicle.

The area determining unit 3 stores coordinate values of the area set for authenticating an occupant sitting on the driver seat and coordinate values of the area set for authenticating an occupant sitting on the passenger seat in a buffer or a storage area (not illustrated).

When determining that the coordinate values of the face area are not located within the area set in advance, the area determining unit 3 instructs the face element detecting unit 2 to stop a detecting process.

When determining that the coordinate values of the face area are located within the area set in advance, the area determining unit 3 outputs this determination result to the face orientation detecting unit 4. The area set in advance in the area determining unit 3 is to be described later in detail.

When the determination result that the coordinate values of the face area are located within the area set in advance is input from the area determining unit 3, the face orientation detecting unit 4 detects orientation of the face on the basis of the coordinate values of the face element input from the face element detecting unit 2. A detecting process of the face orientation detecting unit 4 is described later in detail. The face orientation detecting unit 4 outputs the detected orientation of the face to the face orientation determining unit 5.

The face orientation determining unit 5 determines whether the orientation of the face detected by the face orientation detecting unit 4 is within an angle range set in advance for authenticating an occupant sitting on the front seat of the vehicle. The face orientation determining unit 5 stores in advance the angle range set for authenticating an occupant sitting on the driver seat and the angle range set for authenticating an occupant sitting on the passenger seat in a buffer or a storage area (not illustrated). When determining that the face orientation is within the angle range set in advance, the face orientation determining unit 5 outputs this determination result to the authentication processing unit 6. The angle range set in advance in the face orientation determining unit 5 is described later in detail.

When the determination result that the face orientation is within the angle range set in advance is input from the face orientation determining unit 5, the authentication processing unit 6 collates the characteristic information of the taken image of the face area input from the face detecting unit 1 with characteristic information of a taken image for authentication registered in the storage device 300 and authenticates the person whose image of the face area is taken. The authentication processing unit 6 outputs the authentication result to the control device 400. When the authentication processing unit 6 authenticates the person whose image of the face area is taken, for example, the authentication processing unit obtains an ID allocated to the person in advance from the storage device 300 and outputs the obtained ID as the authentication result to the control device 400.

On the other hand, when the authentication processing unit 6 cannot authenticate the person whose image of the face area is taken, the authentication processing unit outputs information indicating that the person is not registered in the storage device 300 to the control device 400 as the authentication result, for example.

In the storage device 300, characteristic information of a face of a user of the vehicle equipped with the image authentication device 100 is registered. The user of the vehicle includes the occupant who is likely to drive the vehicle and the occupant who is likely to sit on the passenger seat. The characteristic information of the face registered in the storage device 300 is characteristic information of an image taken in advance using the camera 200 or characteristic information of an image taken in advance using other imaging means. In addition, the storage device 300 stores the characteristic information of the face of each user in association with information specifying the corresponding user, for example, the ID. Various pieces of information can be set as those stored in association with the characteristic information of the face.

The control device 400 is a device which controls the vehicle equipped with the image authentication device 100. The control device 400 includes, for example, a control device which adjusts a position and an inclination of the seat of each of the driver seat and the passenger seat, a control device which controls an acoustic device and the like. On the basis of the authentication result input from the authentication processing unit 6, the control device 400 performs control suitable for the authenticated occupant, for example, control of the position and inclination of the seat preferred by the user, acoustic conditions preferred by the user and the like.

Next, a hardware configuration example of the image authentication device 100 is described.

Figure 3A:
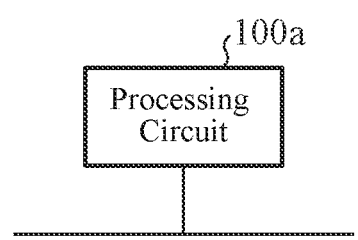
FIGS. 3A and 3B are views each illustrating a hardware configuration example of the image authentication device according to the first embodiment.
Figure 3B:
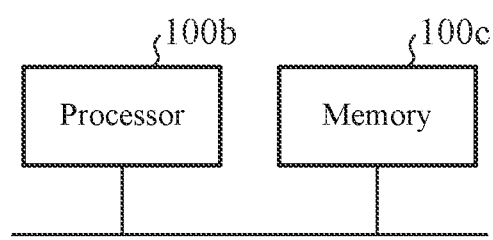

FIGS. 3A and 3B are views each illustrating the hardware configuration example of the image authentication device 100 according to the first embodiment.

The face detecting unit 1, the face element detecting unit 2, the area determining unit 3, the face orientation detecting unit 4, the face orientation determining unit 5, and the authentication processing unit 6 in the image authentication device 100 may be a processing circuit 100*a* being dedicated hardware as illustrated in FIG. 3A or may be a processor 100*b* which executes a program stored in a memory 100*c* as illustrated in FIG. 3B.

When the face detecting unit 1, the face element detecting unit 2, the area determining unit 3, the face orientation detecting unit 4, the face orientation determining unit 5, and the authentication processing unit 6 are the dedicated hardware as illustrated in FIG. 3A, the processing circuit 100*a* corresponds to, for example, a single circuit, a composite circuit, a programmed processor, a parallel programmed processor, an application specific integrated circuit (ASIC), a field-programmable gate array (FPGA), or a combination thereof. Each of the functions of the face detecting unit 1, the face element detecting unit 2, the area determining unit 3, the face orientation detecting unit 4, the face orientation determining unit 5, and the authentication processing unit 6 may be realized by the processing circuit, or the functions of the units may be collectively implemented by one processing circuit.

When the face detecting unit 1, the face element detecting unit 2, the area determining unit 3, the face orientation detecting unit 4, the face orientation determining unit 5, and the authentication processing unit 6 are the processor 100*b* as illustrated in FIG. 3B, the functions of the units are implemented by software, firmware, or a combination of the software and hardware. The software or firmware is described as one or more programs and stored in the memory 100*c*. By reading and executing the programs stored in the memory 100*c*, the processor 100*b* implements the functions of the face detecting unit 1, the face element detecting unit 2, the area determining unit 3, the face orientation detecting unit 4, the face orientation determining unit 5, and the authentication processing unit 6. That is, the face detecting unit 1, the face element detecting unit 2, the area determining unit 3, the face orientation detecting unit 4, the face orientation determining unit 5, and the authentication processing unit 6 are provided with the memory 100*c* for storing the programs which eventually execute each step illustrated in FIG. 6 to be described later when being executed by the processor 100*b*. It may also be said that the programs allow a computer to execute procedures or methods of the face detecting unit 1, the face element detecting unit 2, the area determining unit 3, the face orientation detecting unit 4, the face orientation determining unit 5, and the authentication processing unit 6.

Herein, the processor 100*b* is a central processing unit (CPU), a processing unit, an arithmetic device, a processor, a microprocessor, a microcomputer, a digital signal processor (DSP) or the like, for example.

The memory 100*c* may be, for example, a nonvolatile or volatile semiconductor memory such as a random access memory (RAM), a read only memory (ROM), a flash memory, an erasable programmable ROM (EPROM), and an electrically EPROM (EEPROM), a magnetic disk such as a hard disk and a flexible disk, or an optical disc such as a minidisc, a compact disc (CD), and a digital versatile disc (DVD).

Note that, some of the functions of the face detecting unit 1, the face element detecting unit 2, the area determining unit 3, the face orientation detecting unit 4, the face orientation determining unit 5, and the authentication processing unit 6 may be implemented by the dedicated hardware and some of them may be implemented by the software or firmware. In this manner, the processing circuit 100*a* in the image authentication device 100 can implement the above-described functions by the hardware, software, firmware, or combination thereof.

Next, the area set in advance for authenticating the occupant in the area determining unit 3 is described in detail with reference to FIG. 4.

Figure 4:
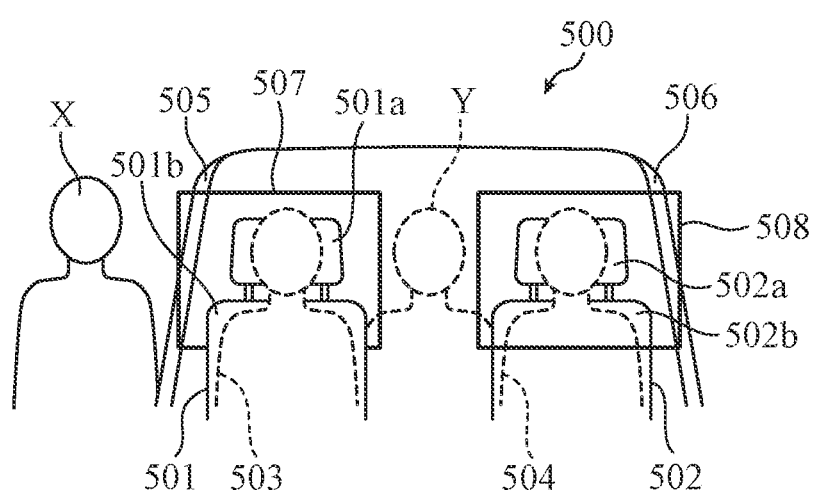
FIG. 4 is a view of the interior of the vehicle equipped with the image authentication device according to the first embodiment as seen from the front, the view illustrating an area set by an area determining unit.

FIG. 4 is a view of the interior of the vehicle equipped with the image authentication device 100 according to the first embodiment as seen from the front, the view illustrating the area set in the area determining unit 3.

In FIG. 4, a case where the occupants 503 and 504 sit on the driver seat 501 and the passenger seat 502, respectively, in the vehicle 500 are assumed, and the occupants 503 and 504 are indicated by dotted lines.

A first pillar 505 is located on an outer side of the driver seat 501 and a second pillar 506 is located on an outer side of the passenger seat 502. A rectangular area 507 is an area set in the area determining unit 3 in order to authenticate the occupant sitting on the driver seat 501. The rectangular area 508 is an area set in the area determining unit 3 in order to authenticate the occupant sitting on the passenger seat 502. The rectangular areas 507 and 508 are set so as to suppress erroneous authentication of the person X located outside the vehicle and the person Y sitting on a rear seat of the vehicle 500.

Although a case where the rectangular area is set is illustrated in FIG. 4 as an example, the area to be set is not limited to the rectangle.

The rectangular area 507 is set around a headrest 501*a* of the driver seat 501. A position on a ceiling side in the vehicle interior of the rectangular area 507 is set to be a position spaced apart by a predetermined distance (for example, about 15 cm) from an upper part of the headrest 501*a* of the driver seat 501 to the ceiling in the vehicle interior. A position on a vehicle exterior side of the rectangular area 507 is set to be a position spaced apart by a predetermined distance (for example, about 20 cm) from a side surface of a backrest 501*b* of the driver seat 501 to the vehicle exterior. A position on a passenger seat 502 side of the rectangular area 507 is set to be a position spaced apart by a predetermined distance (for example, about 10 cm) from the side surface of the backrest 501*b* of the driver seat 501 to the passenger seat 502.

Similarly, the rectangular area 508 is set around a headrest 502*a* of the passenger seat 502. A position on the ceiling side in the vehicle interior of the rectangular area 508 is set to be a position spaced apart by a predetermined distance (for example, about 15 cm) from an upper part of the headrest 502*a* of the passenger seat 502 to the ceiling in the vehicle interior. A position on the vehicle exterior side of the rectangular area 508 is set to be a position spaced apart by a predetermined distance (for example, about 20 cm) from a side surface of a backrest 502*b* of the passenger seat 502 to the vehicle exterior. A position on the driver seat 501 side of the rectangular area 508 is set to be a position spaced apart by a predetermined distance (for example, about 10 cm) from the side surface of the backrest 502*b* of the passenger seat 502 to the driver seat 501.

The distances from the headrests 501*a* and 502*a* to the ceiling in the vehicle interior and the predetermined distances from the backrests 501*b* and 502*b* are values appropriately set so that the faces of the person outside the vehicle and the person on the rear seat do not enter the area. Note that, the setting of the rectangular areas 507 and 508 described above is merely an example and various settings may be appropriately applied as long as those can suppress the erroneous authentication of the faces of the person outside the vehicle 500 and the person on the rear seat of the vehicle 500.

Next, the angle range set in advance for authenticating the occupant in the face orientation determining unit 5 is described in detail.

Figure 5A:
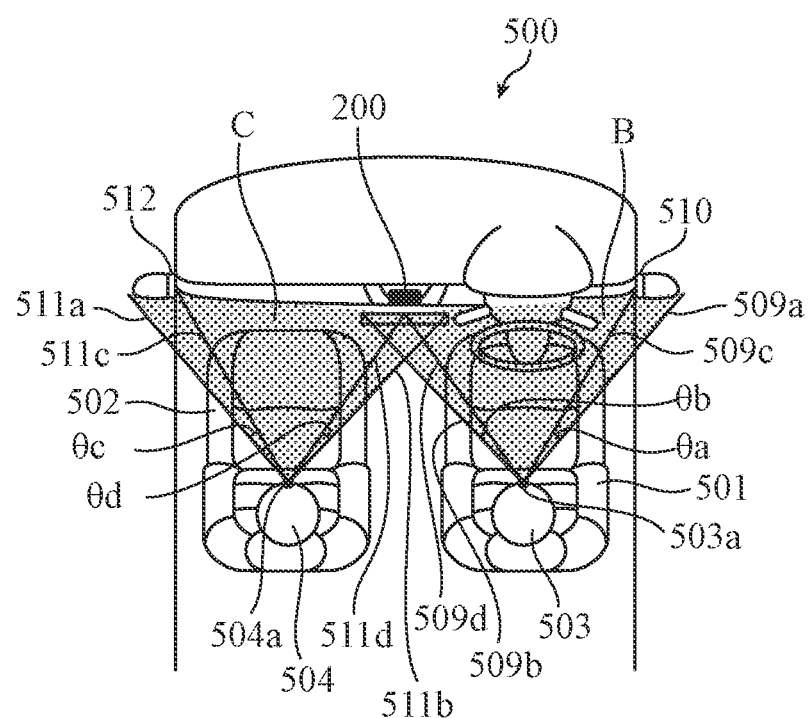
FIGS. 5A and 5B are views each illustrating an example of an angle range set by a face orientation determining unit of the image authentication device.
Figure 5B:
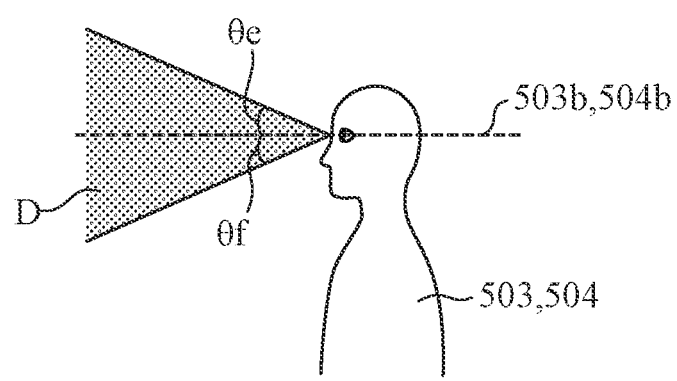

FIGS. 5A and 5B are views each illustrating an example of the angle range set in the face orientation determining unit 5 of the image authentication device 100.

The angle range set in the face orientation determining unit 5 includes the angle range in a width direction of the vehicle and the angle range in a height direction of the vehicle.

FIG. 5A is a view of the vehicle interior of the vehicle equipped with the image authentication device 100 according to the first embodiment as seen from above, the view illustrating the angle range in the width direction of the vehicle set in the face orientation determining unit 5. FIG. 5B is a view of a person sitting in the vehicle equipped with the image authentication device 100 according to the first embodiment as seen from the side, the view illustrating the angle range in the height direction of the vehicle set in the face orientation determining unit 5.

First, with reference to FIG. 5A, the angle range in the width direction of the vehicle set in the face orientation determining unit 5 is described.

The angle range in the width direction of the vehicle set for the occupant 503 sitting on the driver seat 501 is a range indicated by an area B between a straight line 509*a* and a straight line 509*b*. The straight line 509*a* is a straight line obtained by shifting a straight line 509*c* connecting a center position 503*a* between right and left eyes of the occupant 503 and a third pillar 510 in front to the outer side of the vehicle 500 by θa° (for example, 10°, 20° or the like). The straight line 509*b* is a straight line obtained by shifting a straight line 509*d* connecting the center position 503*a* between the right and left eyes of the occupant 503 and the center of a lens of the camera 200 to the passenger seat 502 side by θb° (for example, 10°, 20° or the like). Note that, the straight lines 509*c* and 509*d* are shifted by θa° and θb° respectively around the center position 503*a* between the right and left eyes of the occupant 503.

Similarly, the angle range in the width direction of the vehicle set for the occupant 504 sitting on the passenger seat 502 is a range indicated by an area C between a straight line 511*a* and a straight line 511*b*. The straight line 511*a* is a straight line obtained by shifting a straight line 511*c* connecting a center position 504*a* between right and left eyes of the occupant 504 and a fourth pillar 512 in front of the passenger seat 502 to the outer side of the vehicle 500 by θc° (for example, 10°, 20° or the like). The straight line 511*b* is a straight line obtained by shifting a straight line 511*d* connecting the center position 504*a* between the right and left eyes of the occupant 504 and the center of the lens of the camera 200 to the driver seat 501 side by θd° (for example, 10°, 20° or the like). Note that, the straight lines 511*c* and 511*d* are shifted by θc° and θd° respectively around the center position 504*a* between the right and left eyes of the occupant 504.

Next, the angle range in the height direction of the vehicle set in the face orientation determining unit 5 is described with reference to FIG. 5B.

The angle range set for each of the occupant 503 sitting on the driver seat 501 and the occupant 504 sitting on the passenger seat 502 is a range indicated by an area D in FIG. 5B. The area D is a range of θe° to the ceiling side of the vehicle 500 and θf° to a bottom side of the vehicle 500 around each of the straight lines 503*b* and 504*b* which passes through a midpoint between the brow and a top of the nose of a corresponding one of the occupants 503 and 504 and is parallel to a road on which the vehicle 500 travels.

When the occupant 503 visually recognizes in the area B and the area D, the face orientation determining unit 5 determines that the face orientation of the occupant 503 is within the angle range set in advance for authenticating the occupant. Similarly, when the occupant 504 visually recognizes in the area C and the area D, the face orientation determining unit 5 determines that the face orientation of the occupant 504 is within the angle range set in advance for authenticating the occupant.

Next, an operation of the image authentication device 100 is described.

Figure 6:
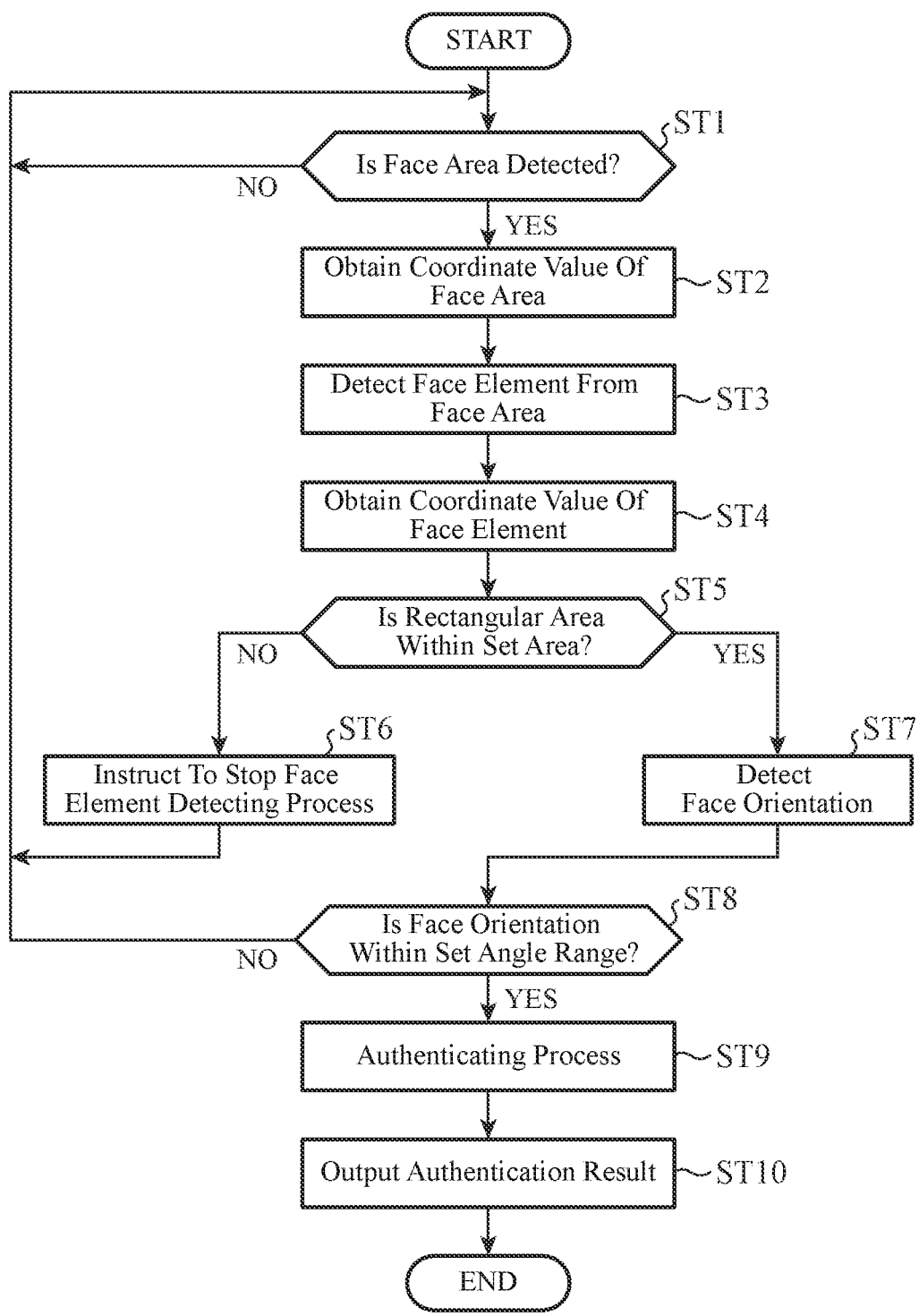
FIG. 6 is a flowchart illustrating an operation of the image authentication device according to the first embodiment.

FIG. 6 is a flowchart illustrating the operation of the image authentication device 100 according to the first embodiment.

The face detecting unit 1 analyzes the taken image input from the camera 200 and performs a detecting process of the face area (step ST1). When the face area is not detected (step ST1; NO), the face detecting unit 1 repeats the detecting process at step ST1. On the other hand, when the face area is detected (step ST1; YES), the face detecting unit 1 obtains the coordinate values of the vertices of the rectangular area surrounding the detected face area (step ST2).

Next, an operation of the vehicle-mounted image authentication device 100 is described.

FIG. 6 is a flowchart illustrating the operation of the vehicle-mounted image authentication device 100 according to the first embodiment.

The face detecting unit 1 analyzes the taken image input from the camera 200 and performs a detecting process of the face area (step ST1). When the face area is not detected (step ST1; NO), the face detecting unit 1 repeats the detecting process at step ST1. On the other hand, when the face area is detected (step ST1; YES), the face detecting unit 1 obtains the coordinate values of the vertices of the rectangular area surrounding the detected face area (step ST2).

The face element detecting unit 2 detects the face elements from the taken image of the face area detected at step ST1 (step ST3). At step ST3, for example, the face element detecting unit 2 detects the face elements set in advance (for example, the eyes, nose, mouth, and ears) in order set in advance. The face element detecting unit 2 obtains the coordinate values of the face elements detected at step ST3 (step ST4). The face element detecting unit 2 repeatedly performs the above-described processes at steps ST3 and ST4 while the determining process at step ST5 to be described later is performed. The face element detecting unit 2 temporarily stores the obtained coordinate values of the face elements in a buffer (not illustrated) or the like.

The area determining unit 3 determines whether the rectangular area having the coordinate values obtained at step ST2 as the vertices is located within the area set in advance for authenticating the occupant sitting on the front seat of the vehicle (step ST5). When the rectangular area surrounding the face area is not located within the area set in advance for authenticating the occupant sitting on the front seat of the vehicle (step ST5; NO), the face element detecting unit 2 is instructed to stop the detecting process (step ST6), and the processing returns to the process at step ST1.

On the other hand, when the rectangular area surrounding the face area is located within the area set for authenticating the occupant sitting on the front seat of the vehicle (step ST5; YES), the face orientation detecting unit 4 detects the face orientation of the person whose image of the face area is taken, on the basis of a positional relationship and a change in time series of the coordinate values of the face elements detected and obtained by the processes at steps ST3 and ST4 (step ST7).

The face orientation determining unit 5 determines whether the face orientation detected at step ST7 is within the angle range set for authenticating the occupant sitting on the front seat of the vehicle (step ST8). When the face orientation is not within the set angle range (step ST8; NO), the processing returns to the process at step ST1.

On the other hand, when the face orientation is within the set angle range (step ST8; YES), the authentication processing unit 6 collates the characteristic information of the taken image of the face area input from the face detecting unit 1 with the characteristic information of the taken image for authentication registered in the storage device 300 and performs the authenticating process for the person whose image of the face area is taken (step ST9). The authentication processing unit 6 outputs an authentication result at step ST9 to the control device 400 (step ST10), and the processing is ended.

When the camera 200 is arranged between the driver seat and the passenger seat and each of the occupant sitting on the driver seat and the occupant sitting on the passenger seat are authenticated as illustrated in FIGS. 4 and 5, there is a case where the face detecting unit 1 detects a plurality of face areas.

As described above, according to the first embodiment, it is configured to be provided with a face detecting unit 1 for detecting a face area in which a face of a person is located and characteristic information of the face area from a taken image in which an imaging range in which an occupant sitting on a driver seat and an occupant sitting on a passenger seat of a vehicle are able to be imaged is imaged, a face element detecting unit 2 for analyzing the taken image of the detected face area and detecting an element of the face of the person, an area determining unit 3 for determining whether the detected face area is located within an area set for authenticating an occupant sitting on a front seat of the vehicle, a face orientation detecting unit 4 for calculating orientation of the face of the person on the basis of position information in the taken image of the detected element of the face of the person, a face orientation determining unit 5 for determining whether the calculated orientation of the face of the person is within a range of the face orientation set for authenticating the occupant sitting on the front seat of the vehicle, and an authentication processing unit 6 for, when it is determined that the calculated orientation of the face is within the set range of the face orientation, collating the characteristic information of the taken image of the face area with characteristic information of a taken image for authentication accumulated in advance and authenticating the person whose face area is detected, so that it is possible to extract the face image of the person to be authenticated to authenticate even when a person other than the person to be authenticated is imaged in the taken image. Therefore, it is possible to authenticate the occupant sitting on the driver seat and the occupant sitting on the passenger seat even when there is only one vehicle-mounted camera. Furthermore, it is possible to prevent the authenticating process from being executed for a person present in a position not suitable for the authentication.

Figure 7:
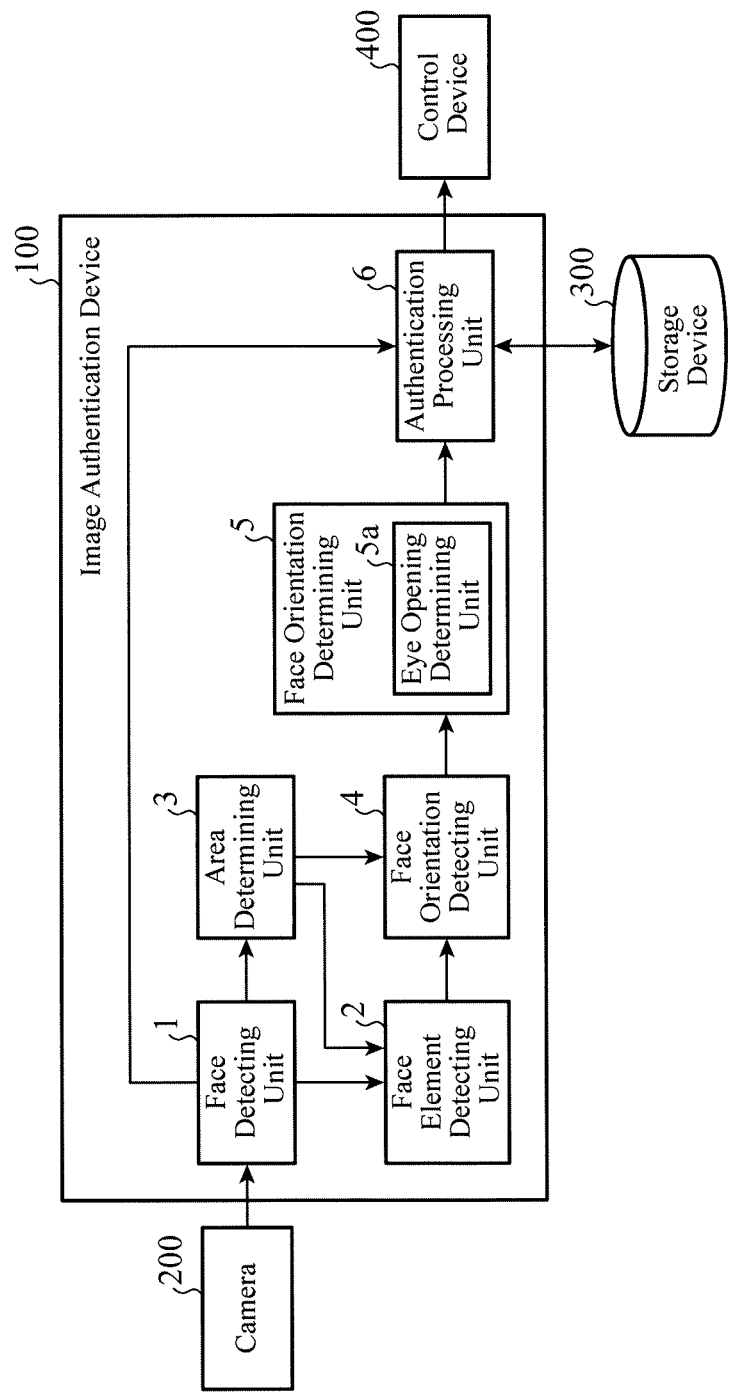
FIG. 7 is a block diagram illustrating another configuration of the image authentication device according to the first embodiment.

In the first embodiment described above, the configuration is described in which the face orientation determining unit 5 determines whether the orientation of the face of the person is within the range of the face orientation set for authenticating the occupant sitting on the front seat of the vehicle, and when it is determined that this is within the set range of the face orientation, the authentication processing unit 6 authenticates the person whose face area is detected. The authentication processing unit 6 may also be configured to authenticate the person whose face area is detected on the basis of whether the eyes of the person are open, for example, in addition to the above-described orientation of the face of the person. FIG. 7 illustrates the configuration of the image authentication device 100 which authenticates the person on the basis of whether the eyes of the person are open in addition to the orientation of the face of the person.

FIG. 7 is a block diagram illustrating another configuration of the image authentication device 100 according to the first embodiment.

FIG. 7 illustrates an example configured by adding an eye opening determining unit 5a to the face orientation determining unit 5 of the image authentication device 100 illustrated in FIG. 1. Hereinafter, the same reference signs as those used in FIG. 1 are assigned to the same or corresponding components as those of the above-described image authentication device 100 and the description thereof is omitted or simplified.

The face element detecting unit 2 detects, for example, eye corners, upper eyelids, and lower eyelids in addition to the eyes, nose, mouth, ears, and hairstyle as the face elements within the face area input from the face detecting unit 1. The face element detecting unit 2 outputs the coordinate values of the detected face elements to the face orientation detecting unit 4 and the eye opening determining unit 5a.

The face orientation determining unit 5 determines whether the orientation of the face detected by the face orientation detecting unit 4 is within an angle range set in advance for authenticating the occupant sitting on the front seat of the vehicle. When the face orientation determining unit 5 determines that the face orientation is within the angle range set in advance, the eye opening determining unit 5a determines whether the eyes of the person are open on the basis of the coordinate values of the face elements input from the face element detecting unit 2. Specifically, the eye opening determining unit 5a determines whether the eyes of the person are open using the coordinate values regarding the eyes such as the eyes, eye corners, upper eyelids, and lower eyelids. For example, when differences between the coordinate values of the upper eyelids and lower eyelids are equal to or larger than a threshold, the eye opening determining unit 5a determines that the eyes of the person are open. The face orientation determining unit 5 outputs the determination result on the face orientation and the determination result on whether the eyes are open to the authentication processing unit 6.

When the determination result that the face orientation is within the angle range set in advance is input from the face orientation determining unit 5 and the determination result that the eyes of the person are open is input from the eye opening determining unit 5a, the authentication processing unit 6 collates the characteristic information of the taken image of the face area input from the face detecting unit 1 with the characteristic information of the taken image for authentication registered in the storage device 300 and authenticates the person whose image of the face area is taken. The authentication processing unit 6 outputs the authentication result to the control device 400.

Next, the operation of the image authentication device 100 for determining whether the eyes of the person are open in addition to the orientation of the face of the person is described.

Figure 8:
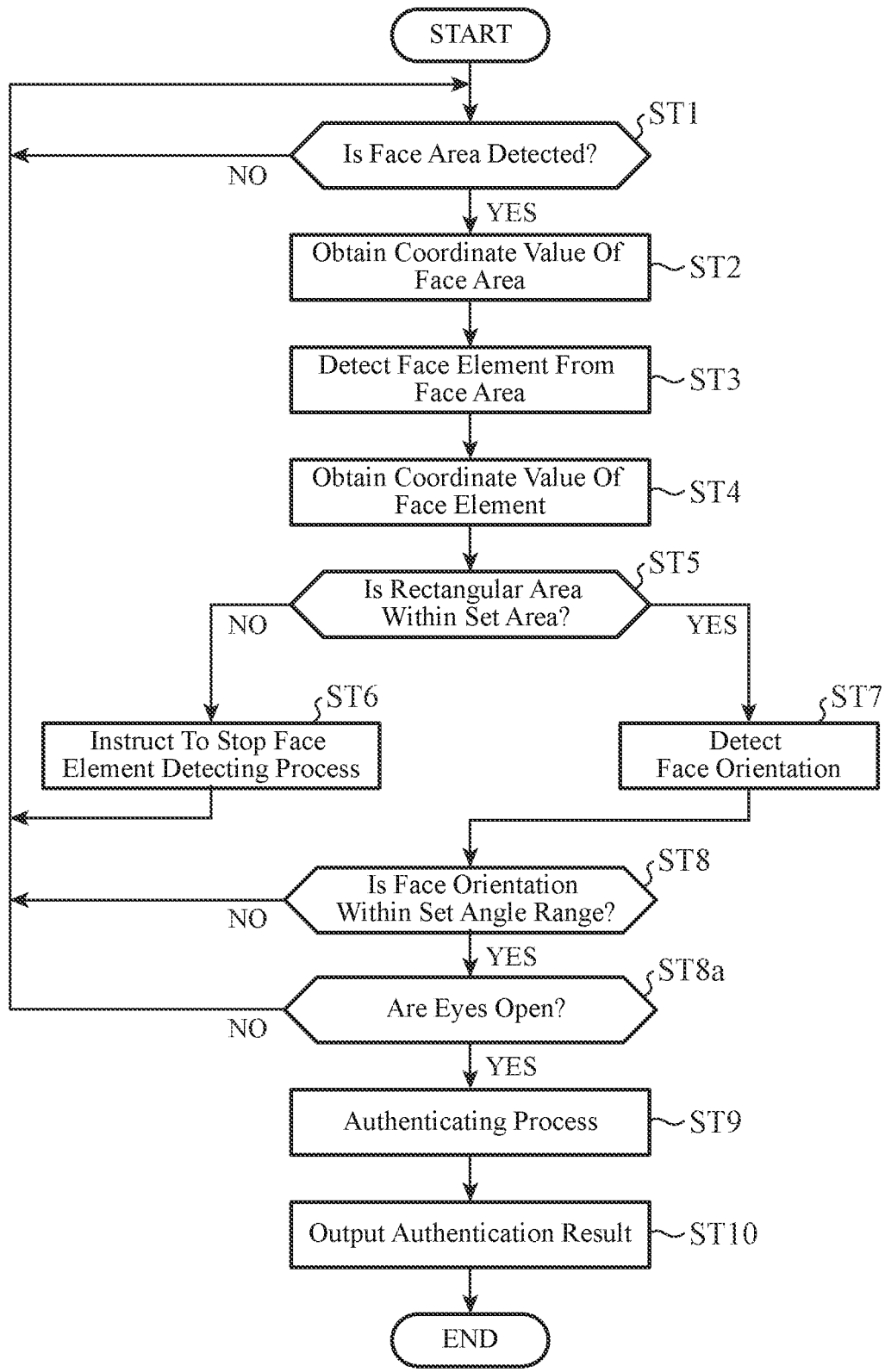
FIG. 8 is a flowchart illustrating another operation of the image authentication device according to the first embodiment.

FIG. 8 is a flowchart illustrating another operation of the image authentication device 100 according to the first embodiment. Note that, hereinafter, the same steps as those of the image authentication device 100 described above are assigned with the same reference signs as those used in FIG. 6, and the description thereof is omitted or simplified.

At step ST8, when it is determined that the face orientation is within the set angle range (step ST8; YES), the eye opening determining unit 5a determines whether the eyes of the person are open (step ST8a). When the eyes of the person are not open (step ST8a; NO), the processing returns to the process at step ST1. On the other hand, when the eyes of the person are open (step ST8a; YES), the authentication processing unit 6 collates the characteristic information of the taken image of the face area input from the face detecting unit 1 with the characteristic information of the taken image for authentication registered in the storage device 300 and performs the authenticating process for the person whose image of the face area is taken (step ST9). The authentication processing unit 6 outputs an authentication result at step ST9 to the control device 400 (step ST10) and the processing is ended.

As described above, the eye opening determining unit 5a for determining whether the eyes of the person are open, for example, on the basis of the position information in the taken image of the face of the person detected by the face element detecting unit 2 is provided, and the authentication processing unit 6 is configured to authenticate the person when the orientation of the face of the person is within the set range of the face orientation and the eye opening determining unit 5a determines that the eyes of the person are open, so that it is possible to prevent the authenticating process from being executed for the person present at a position not suitable for the authentication or the person closing the eyes.

Second Embodiment

In a second embodiment, a configuration of repeating an authenticating process a plurality of times until a person whose image of a face area is taken is authenticated is described.

Figure 9:
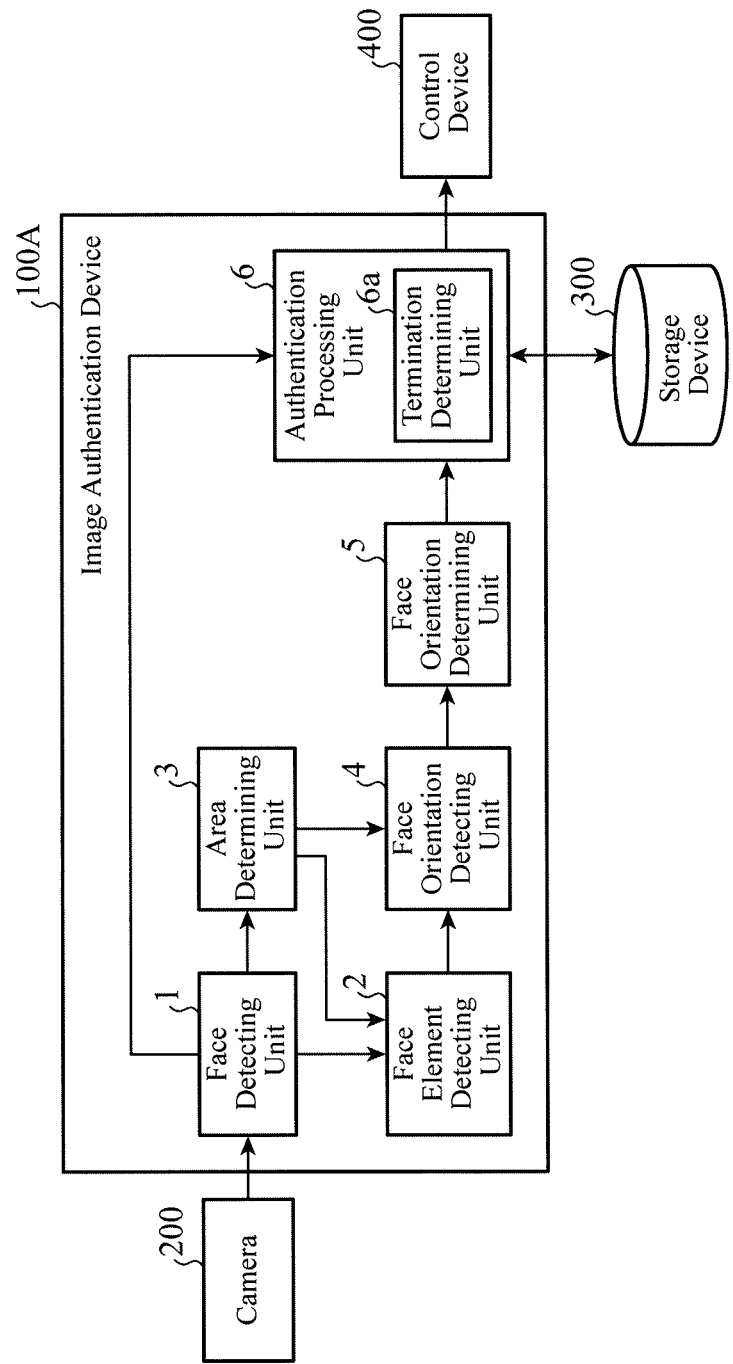
FIG. 9 is a block diagram illustrating a configuration of an image authentication device according to a second embodiment.

FIG. 9 is a block diagram illustrating a configuration of a vehicle mounted an image authentication device 100A according to the second embodiment.

The image authentication device 100A according to the second embodiment is configured by adding a termination determining unit 6a to an authentication processing unit 6 of a vehicle mounted an image authentication device 100 described in the first embodiment.

Hereinafter, the same reference signs as those used in the first embodiment are assigned to the same or corresponding components as those of the image authentication device 100 according to the first embodiment and the description thereof is omitted or simplified.

When the authentication processing unit 6 does not authenticate the person whose image of the face area is taken, the termination determining unit 6a determines whether the authenticating process is repeated a prescribed number of times or during a prescribed period. The termination determining unit 6a counts the number of times of a collating process performed by the authentication processing unit 6, for example, and stores the counted number of times in a temporary storage area (not illustrated) such as a buffer. When the stored number of times is smaller than the prescribed number of times, the termination determining unit 6a instructs a face detecting unit 1 to repeat the authenticating process.

The termination determining unit 6a may also obtain shift position information from a vehicle 500, for example, and determine whether a shift position moves from a stop position (P) to a different position (other than P). The termination determining unit 6a instructs the face detecting unit 1 to repeat the authenticating process during a period until the shift position of the vehicle 500 moves to the different position (other than P).

The termination determining unit 6a may also obtain vehicle speed information from the vehicle 500, for example, and determine whether a vehicle speed of the vehicle 500 reaches 1 km/h or higher. The termination determining unit 6a instructs the face detecting unit 1 to repeat the authenticating process during a period until the vehicle speed of the vehicle 500 reaches 1 km/h or higher.

Next, an operation of the image authentication device 100A is described.

Figure 10:
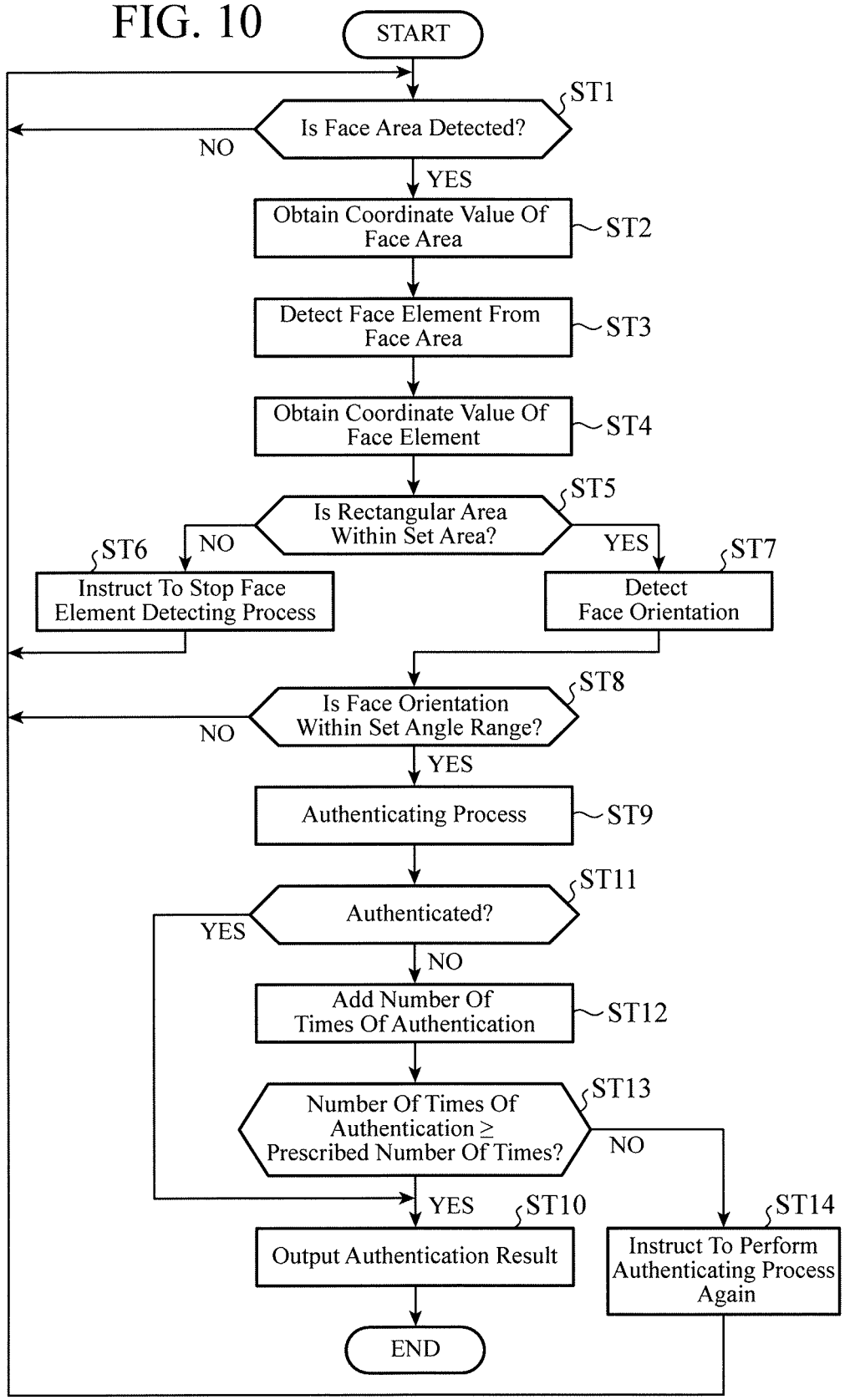
FIG. 10 is a flowchart illustrating an operation of the image authentication device according to the second embodiment.

FIG. 10 is a flowchart illustrating the operation of the image authentication device 100A according to the second embodiment. Note that, the flowchart in FIG. 10 illustrates a case where the termination determining unit 6a determines on the basis of the number of times of the collating process.

Note that, hereinafter, the same steps as those of the image authentication device 100 according to the first embodiment are assigned with the same reference signs as those used in FIG. 6, and the description thereof is omitted or simplified.

At step ST9, when the authentication processing unit 6 performs the authenticating process, the termination determining unit 6a determines whether the person whose image of the face area is taken is authenticated (step ST11). When it is determined that the person whose image of the face area is taken is authenticated (step ST11; YES), the processing proceeds to a process at step ST10.

On the other hand, when it is determined that the person whose image of the face area is taken is not authenticated (step ST11; NO), the termination determining unit 6a adds "1" to the number of times of authentication (step ST12), and determines whether the number of times of authentication after the addition is equal to or larger than a prescribed number of times (step ST13). When the number of times of authentication is smaller than a prescribed number of times (step ST13; NO), the termination determining unit 6a instructs the face detecting unit 1 to perform the authenticating process again (step ST14). On the other hand, when the number of times of authentication is equal to or larger than the prescribed number of times (step ST13; YES), the processing proceeds to the process at step ST10.

As described above, according to the second embodiment, the termination determining unit 6a for, when the authentication processing unit 6 cannot authenticate the person whose face area is detected, determining whether the number of times of authentication or an authentication time in the authentication processing unit 6 reaches a prescribed number of times or a prescribed time, and at the time of not reaching, instructing the face detecting unit 1 to detect the face area again is provided, so that when the timing of taking the image of the person is not appropriate, it is possible to execute again the authenticating process for the image taken at an appropriate timing. Specifically, when the person gets on the vehicle 500, when hair covers the face and the person cannot be authenticated from the taken image, the authenticating process can be executed again on the basis of the new taken image. As a result, it is possible to suppress a problem that the user is not authenticated even though the user is registered in the storage device 300.

Third Embodiment

In a third embodiment, a configuration of changing a collation threshold of an authentication processing unit 6 on the basis of detected face orientation is described.

Figure 11:
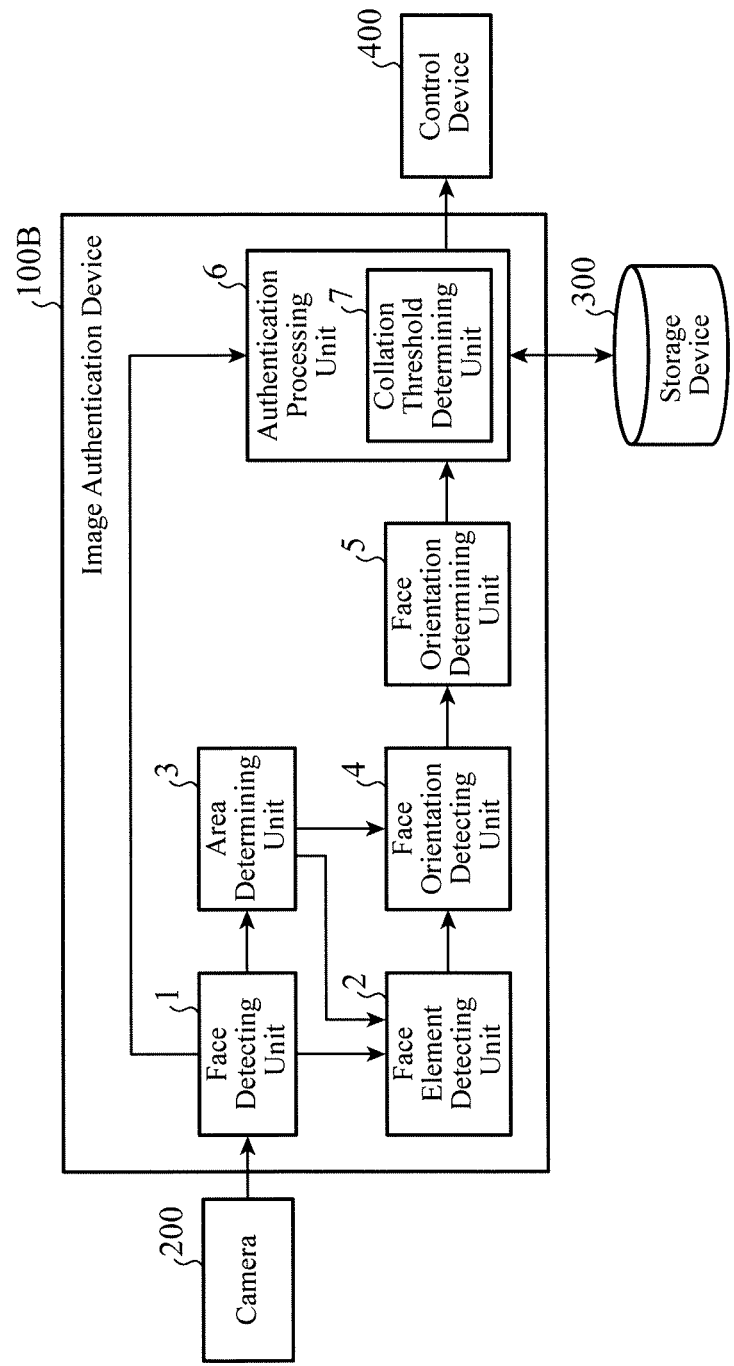
FIG. 11 is a block diagram illustrating a configuration of a vehicle mounted an image authentication device according to a third embodiment.

FIG. 11 is a block diagram illustrating a configuration of an image authentication device 100B according to the third embodiment.

The image authentication device 100B according to the third embodiment is configured by adding a collation threshold determining unit 7 to the image authentication device 100 described in the first embodiment.

Hereinafter, the same reference signs as those used in the first embodiment are assigned to the same or corresponding components as those of the image authentication device 100 according to the first embodiment and the description thereof is omitted or simplified.

When an authentication processing unit 6 collates characteristic information of a taken image of a face area input from a face detecting unit 1 with characteristic information of a taken image for authentication registered in a storage device 300, in a case where the orientation of the face at the time of registration in the storage device 300 is close to the orientation of the face of the taken image of the face area, a degree of coincidence is calculated to be high. On the other hand, when the orientation of the face at the time of registration in the storage device 300 is different from the orientation of the face of the taken image of the face area, the authentication processing unit 6 calculates the degree of coincidence to be low. The authentication processing unit 6 performs the authentication on the basis of whether the calculated degree of coincidence is equal to or larger than the collation threshold. Therefore, depending on the face orientation of the taken image of the face area, there is a case where the authentication processing unit 6 authenticates the same person and a case of not authenticating the same person.

Therefore, the collation threshold determining unit 7 determines the collation threshold when the authentication processing unit 6 performs authentication depending on the face orientation of the taken image of the face area.

First, it is assumed that the storage device 300 stores the characteristic information of the face of each user in association with information specifying the corresponding user and information indicating the face orientation of the taken image for authentication for the corresponding user.

When a determination result that the face orientation is within an angle range set in advance is input from a face orientation determining unit 5, the collation threshold determining unit 7 obtains the characteristic information of the taken image for authentication used for collation and the information indicating the face orientation of the taken image for authentication from the storage device 300. The collation threshold determining unit 7 compares the face orientation of the taken image for authentication with the face orientation of the taken image of the face area determined to be within the angle range set in advance by the face orientation determining unit 5. The collation threshold determining unit 7 sets the collation threshold higher than a prescribed value as angles of the face orientation of the taken image for authentication and the face orientation of the taken image of the face area are closer. On the other hand, the collation threshold determining unit 7 sets the collation threshold lower than the prescribed value as the angles of the face orientation of the taken image for authentication and the face orientation of the taken image of the face area are different.

On the basis of the collation threshold set by the collation threshold determining unit 7, the authentication processing unit 6 collates the characteristic information of the taken image of the face area input from the face detecting unit 1 with the characteristic information of the taken image for authentication obtained by the collation threshold determining unit 7 from the storage device 300, and performs an authenticating process for the person whose image of the face area is taken.

The collation threshold determining unit 7 may determine the collation threshold on the basis of conditions other than the face orientation. For example, the collation threshold determining unit 7 determines the collation threshold on the basis of a relationship between the coordinate values in the taken image of the face area and the coordinate values of the face area in the taken image for authentication registered in the storage device 300. Specifically, the collation threshold determining unit 7 may determine the collation threshold on the basis of the position of the face area in the image. When the position of the face area is on an edge of the taken image, there is a possibility of imaging the face from the side, so that the collation threshold determining unit 7 sets the collation threshold to be lower than the prescribed value.

Next, an operation of the image authentication device 100B is described.

Figure 12:
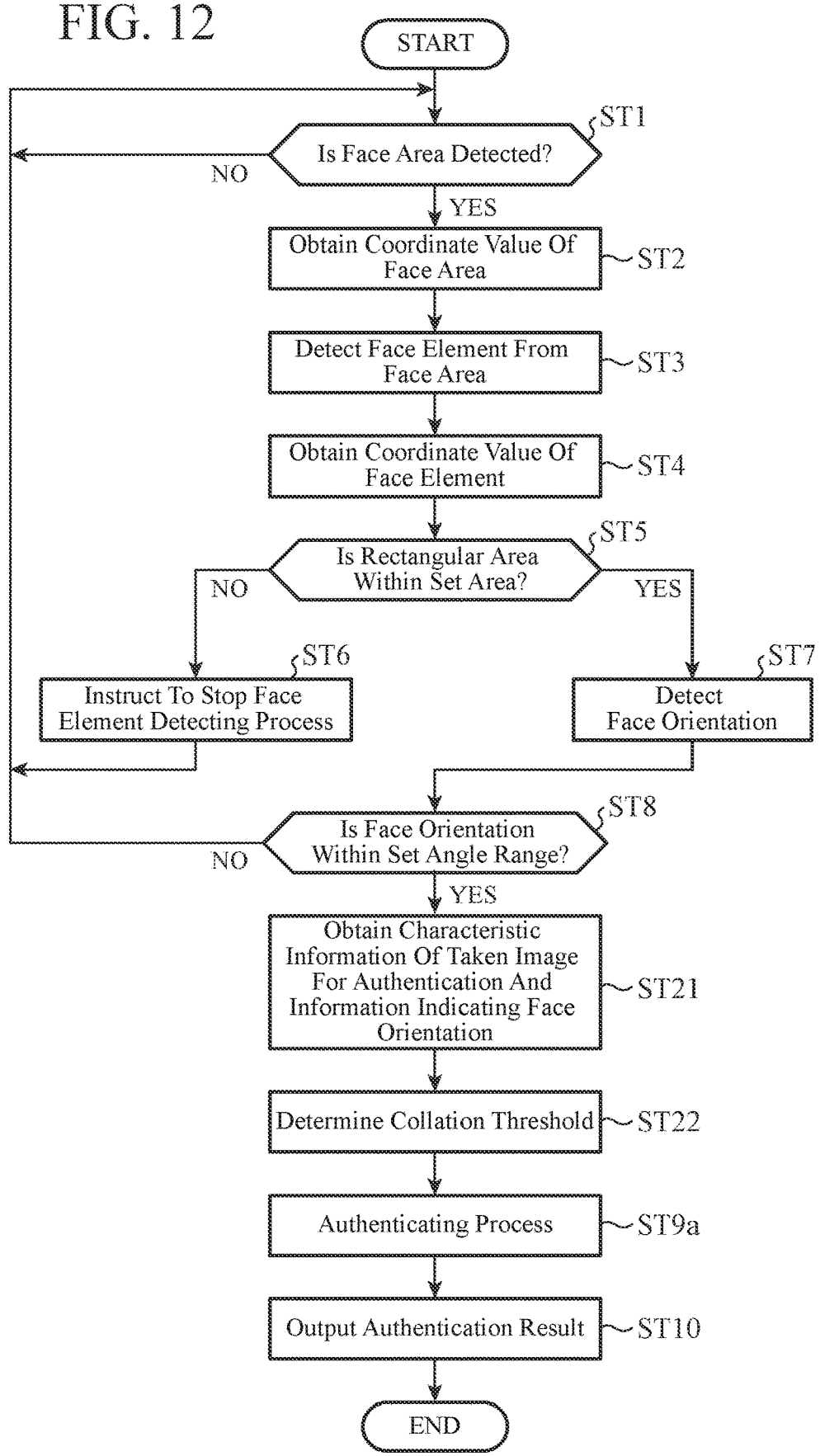
FIG. 12 is a flowchart illustrating an operation of the image authentication device according to the third embodiment.

FIG. 12 is a flowchart illustrating the operation of the image authentication device 100B according to the third embodiment. Note that, hereinafter, the same steps as those of the image authentication device 100 according to the first embodiment are assigned with the same reference signs as those used in FIG. 6, and the description thereof is omitted or simplified.

Also, in the flowchart in FIG. 12, a case where the collation threshold determining unit 7 determines the collation threshold on the basis of the face orientation of the taken image of the face area.

At step ST8, when it is determined that the face orientation is within the set angle range (step ST8; YES), the collation threshold determining unit 7 obtains the characteristic information of the taken image for authentication and the information indicating the face orientation of the taken image for authentication from the storage device 300 (step ST21). The collation threshold determining unit 7 compares the face orientation of the taken image for authentication obtained at step ST21 with the face orientation detected by the face orientation detecting unit 4 to determine the collation threshold (step ST22). Note that the collation threshold determining unit 7 obtains the face orientation detected by the face orientation detecting unit 4 via the face orientation determining unit 5.

On the basis of the collation threshold determined at step ST22, the authentication processing unit 6 collates the characteristic information of the taken image of the face area input from the face detecting unit 1 with the characteristic information of the taken image for authentication obtained at step ST21, and performs the authenticating process for the person whose image of the face area is taken (step ST9a). The authentication processing unit 6 outputs an authentication result at step ST9a to the control device 400 (step ST10) and the processing is ended.

As described above, according to the third embodiment, the collation threshold determining unit 7 for determining the collation threshold on the basis of at least one of the position in the taken image of the face area and the orientation of the face of the person detected by the face orientation detecting unit 4 is provided, and the authentication processing unit 6 is configured to collate the characteristic information of the taken image of the face area detected by the face detecting unit 1 with the characteristic information of the taken image for authentication accumulated in advance and authenticate the person on the basis of whether the collation result is equal to or larger than the collation threshold, so that it is possible to alleviate conditions of the position and face orientation in the taken image when performing the authenticating process. Furthermore, even when the position and face orientation in the taken image when performing the authenticating process are different from those in the taken image for authentication, authentication performance can be improved.

Note that, although a case where the face orientation for authentication is accumulated for each taken image for authentication is described as an example in the above-described third embodiment, when the image for authentication is taken at a face orientation angle set in advance, it is also possible to register the face orientation angle in the storage device 300. Also, when the image is taken at the face orientation angle set in advance, the collation threshold determining unit 7 may hold the face orientation angle.

Note that, although the configuration obtained by adding the collation threshold determining unit 7 to the authentication processing unit 6 of the image authentication device 100 described in the first embodiment is described in the above-described third embodiment, it is also possible to further add the collation threshold determining unit 7 to the authentication processing unit 6 of the image authentication device 100A described in the second embodiment.

Fourth Embodiment

In a fourth embodiment, a configuration of starting an authenticating process with detection of a certain vehicle state as a trigger is described.

Figure 13:
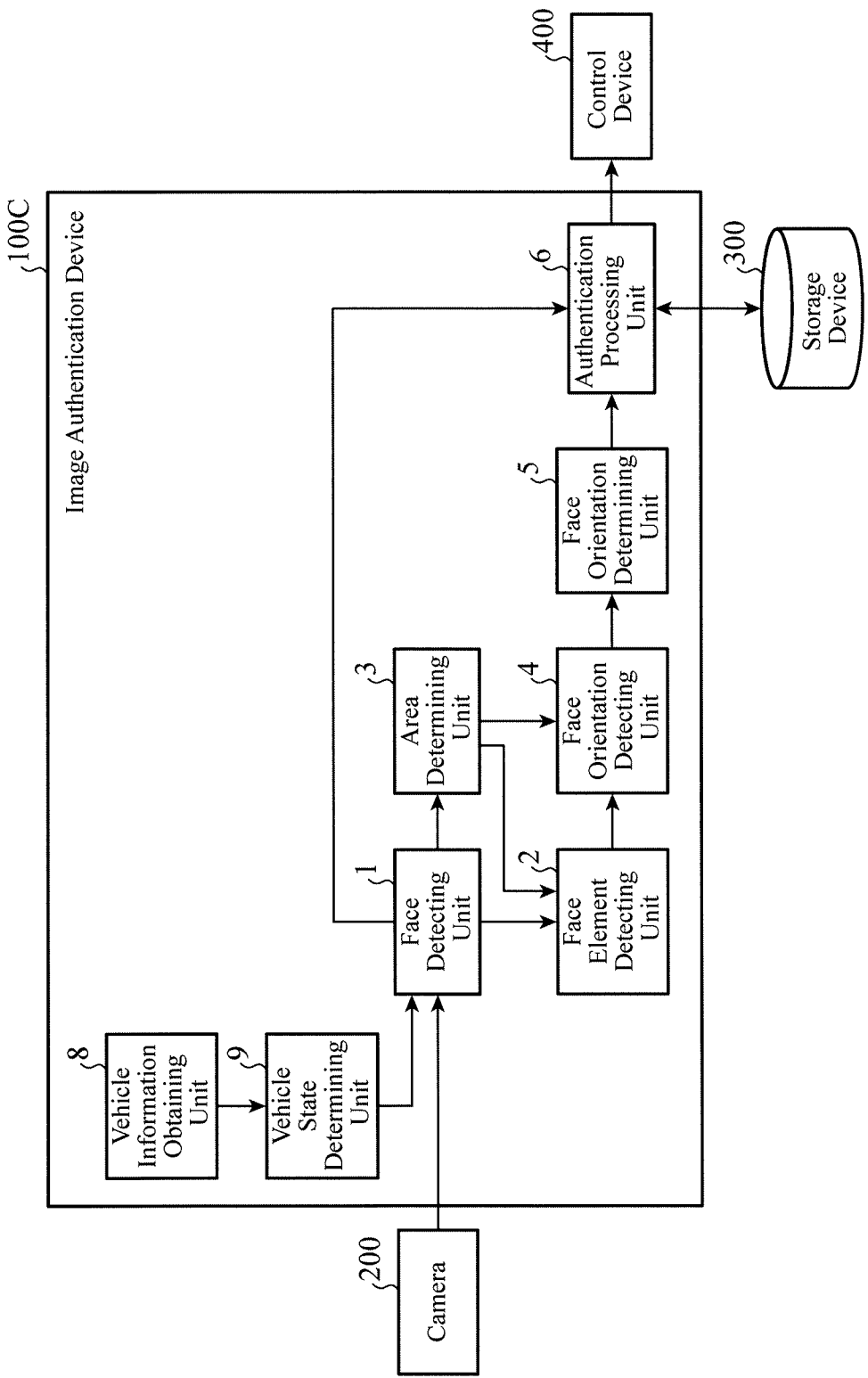
FIG. 13 is a block diagram illustrating a configuration of a vehicle mounted an image authentication device according to a fourth embodiment.

FIG. 13 is a block diagram illustrating a configuration of an image authentication device 100C according to the fourth embodiment.

The image authentication device 100C according to the fourth embodiment is configured by adding a vehicle information obtaining unit 8 and a vehicle state determining unit 9 to an image authentication device 100 described in the first embodiment.

Hereinafter, the same reference signs as those used in the first embodiment are assigned to the same or corresponding components as those of the image authentication device 100 according to the first embodiment and the description thereof is omitted or simplified.

The vehicle information obtaining unit 8 obtains vehicle information from, for example, a vehicle sensor, a navigation device, a GPS receiver (not illustrated) and the like. The vehicle information includes, for example, information indicating unlocking and locking of a door, information indicating opening and closing of the door, information indicating fastening and unfastening of a seat belt, information indicating an ON or OFF state of an ignition, information indicating an ON or OFF state of a human sensor, information indicating a position of a shift lever, information indicating a vehicle speed, information indicating a guidance state of a navigation device, position information of the vehicle and the like. The vehicle information obtaining unit 8 obtains at least one of these pieces of vehicle information and outputs the same to the vehicle state determining unit 9.

The vehicle state determining unit 9 refers to the vehicle information obtained by the vehicle information obtaining unit 8, and when detecting that the vehicle state reaches a state set in advance for authenticating an occupant, instructs a face detecting unit 1 to perform a face detecting process from a taken image.

In the example of the above-described vehicle information, the vehicle state determining unit 9 instructs the face detecting unit 1 to perform the face detecting process from the taken image when detecting any of the unlocking of the door, opening of the door, fastening of the seat belt, turn ON of the ignition, turn ON of the human sensor, motion of the shift lever to a drive position, the vehicle speed exceeding 0 km/h, start of the guidance of the navigation device, departure of the vehicle from home and the like.

Next, a hardware configuration example of the image authentication device 100C is described. Note that views each illustrating the hardware configuration example of the image authentication device 100C of the fourth embodiment are the same as FIG. 3A and FIG. 3B illustrated in the first embodiment, and are therefore not illustrated. Also, description of the same components as those of the first embodiment is also omitted.

The vehicle information obtaining unit 8 and the vehicle state determining unit 9 in the image authentication device 100C may be a processing circuit 100*a* being dedicated hardware as illustrated in FIG. 3A or may be a processor 100*b* which executes a program stored in a memory 100*c* as illustrated in FIG. 3B.

Also, when the vehicle information obtaining unit 8 and the vehicle state determining unit 9 are the processor 100*b* as illustrated in FIG. 3B, the functions of the vehicle information obtaining unit 8 and the vehicle state determining unit 9 are implemented by software, firmware, or a combination of the software and hardware. The software or firmware is described as one or more programs and stored in the memory 100*c*. The processor 100*b* implements the functions of the vehicle information obtaining unit 8 and the vehicle state determining unit 9 by reading and executing the programs stored in the memory 100*c*. That is, the vehicle information obtaining unit 8 and the vehicle state determining unit 9 is provided with the memory 100*c* for storing the programs which eventually execute each step illustrated in FIG. 14 to be described later when being executed by the processor 100*b*. It may also be said that the programs allow a computer to execute procedures or methods of the vehicle information obtaining unit 8 and the vehicle state determining unit 9.

Note that, some of the functions of the vehicle information obtaining unit 8 and the vehicle state determining unit 9 may be implemented by the dedicated hardware and some of them may be implemented by the software or firmware. In this manner, the processing circuit 100*a* in the image authentication device 100C may implement the above-described functions by the hardware, software, firmware, or combination thereof.

Next, an operation of the image authentication device 100C is described.

Figure 14:
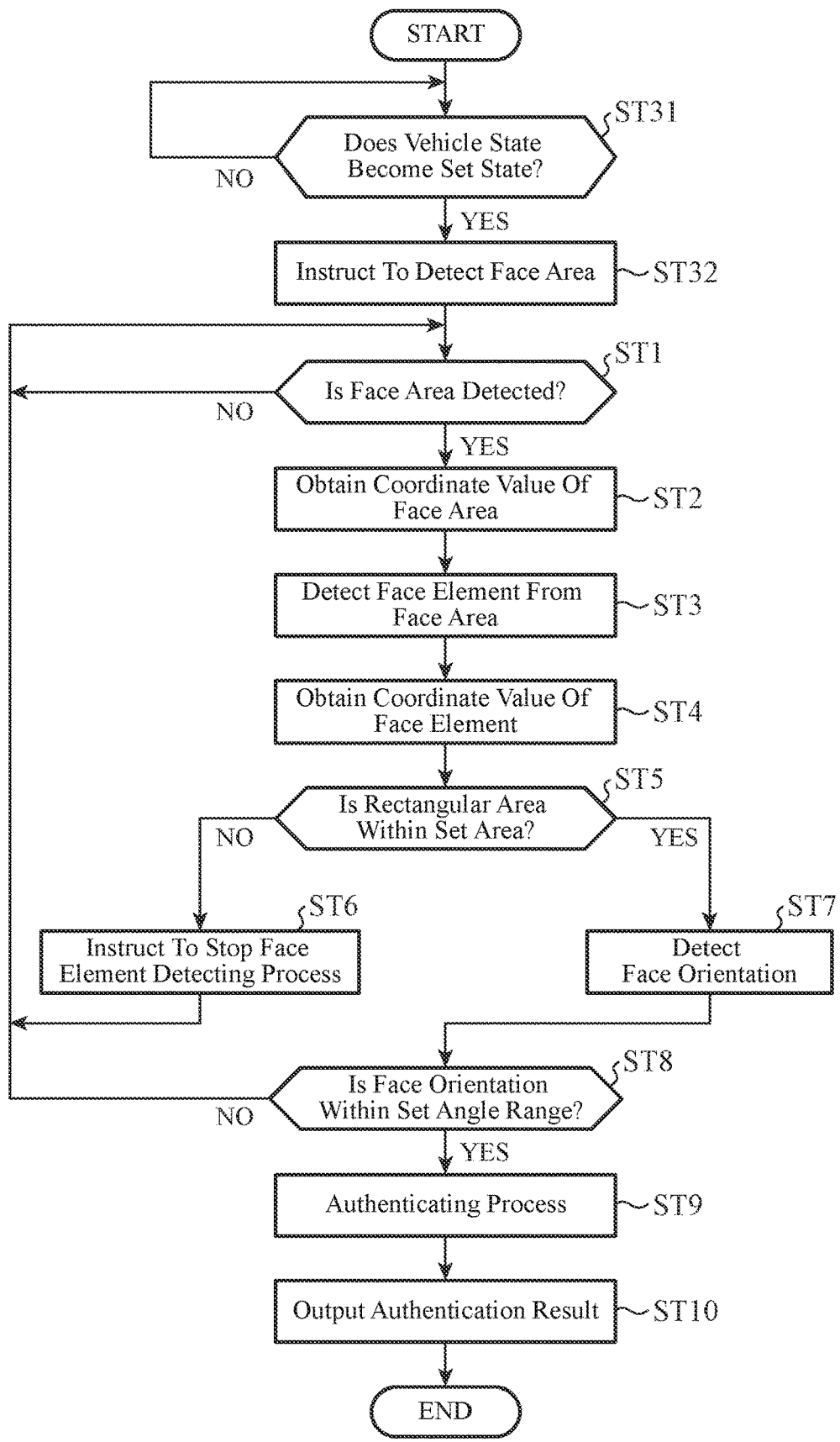
FIG. 14 is a flowchart illustrating an operation of the image authentication device according to the fourth embodiment.

FIG. 14 is a flowchart illustrating the operation of the image authentication device 100C according to the fourth embodiment.

The vehicle state determining unit 9 refers to the vehicle information obtained by the vehicle information obtaining unit 8 and determines whether the vehicle state becomes a state set in advance (step ST31). When the vehicle state does not become the state set in advance (step ST31; NO), the vehicle state determining unit 9 repeats the process at step ST31. On the other hand, when the vehicle state becomes the state set in advance (step ST31; YES), the vehicle state determining unit 9 instructs the face detecting unit 1 to perform a detecting process of a face area (step ST32). Thereafter, the image authentication device 100C performs processes from step ST1 to step ST10.

Note that, although it is described above that an area set in an area determining unit 3 is set in advance, the area set in the area determining unit 3 may be a fixed area, or may be an area set depending on a type of vehicle information referred to by the vehicle state determining unit 9.

For example, the area set in the area determining unit 3 is changed between a case where the vehicle state determining unit 9 starts the authenticating process with detection of the opening of the door as the trigger and a case where the vehicle state determining unit starts the authenticating process with detection of the fastening of the seat belt as the trigger.

When the vehicle state determining unit 9 uses the detection of the opening of the door as the trigger, the areas to be set in the area determining unit 3 are set to be closer to a door on a driver seat side and a door on a passenger seat side. On the other hand, when the vehicle state determining unit 9 uses the detection of the fastening of the seat belt as the trigger, the areas to be set in the area determining unit 3 are set to be in the vicinity of headrests of the driver seat and the passenger seat.

The area determining unit 3 accumulates the setting areas depending on the vehicle states used by the vehicle state determining unit 9 as the triggers in advance, and reads out the setting area depending on the determination result input from the vehicle state determining unit 9. Alternatively, the vehicle state determining unit 9 may accumulate the setting areas depending on the vehicle states and set the setting area depending on the determination result to the area determining unit 3.

By setting the area used for determination by the area determining unit 3 depending on the vehicle state, it is possible to perform a determining process of whether the face area is present in a position which is always suitable for the authenticating process.

As described above, according to the fourth embodiment, the vehicle state determining unit 9 for referring to the vehicle information of the vehicle, and instructing the face detecting unit 1 to detect the face area when determining that the vehicle state of the vehicle becomes the state set for authenticating the occupant sitting on the front seat of the vehicle is provided, so that even when a person other than the person to be authenticated is imaged in the taken image, it is possible to extract a face image of the person to be authenticated and perform authentication when the vehicle state becomes the set vehicle state and to prevent the authenticating process from being executed for a person present in a position not suitable for the authentication. Therefore, even when there is only one vehicle-mounted camera, it is possible to authenticate the occupant sitting on the front seat of the vehicle.

According to the fourth embodiment, the area for authenticating the occupant sitting on the front seat of the vehicle set in the area determining unit 3 is configured to be the fixed area or the area set depending on the type of the vehicle information referred to by the vehicle state determining unit 9, so that it is possible to perform the determining process of determining whether the face area is present in the position suitable for the authenticating process.

Note that, although the configuration obtained by adding the vehicle information obtaining unit 8 and the vehicle state determining unit 9 to the image authentication device 100 described in the first embodiment is described in the above-described fourth embodiment, it is also possible to add the vehicle information obtaining unit 8 and the vehicle state determining unit 9 to the image authentication device 100A described in the second embodiment.

Fifth Embodiment

In a fifth embodiment, a configuration for setting a collation threshold for an authenticating process on the basis of vehicle information is described.

Figure 15:
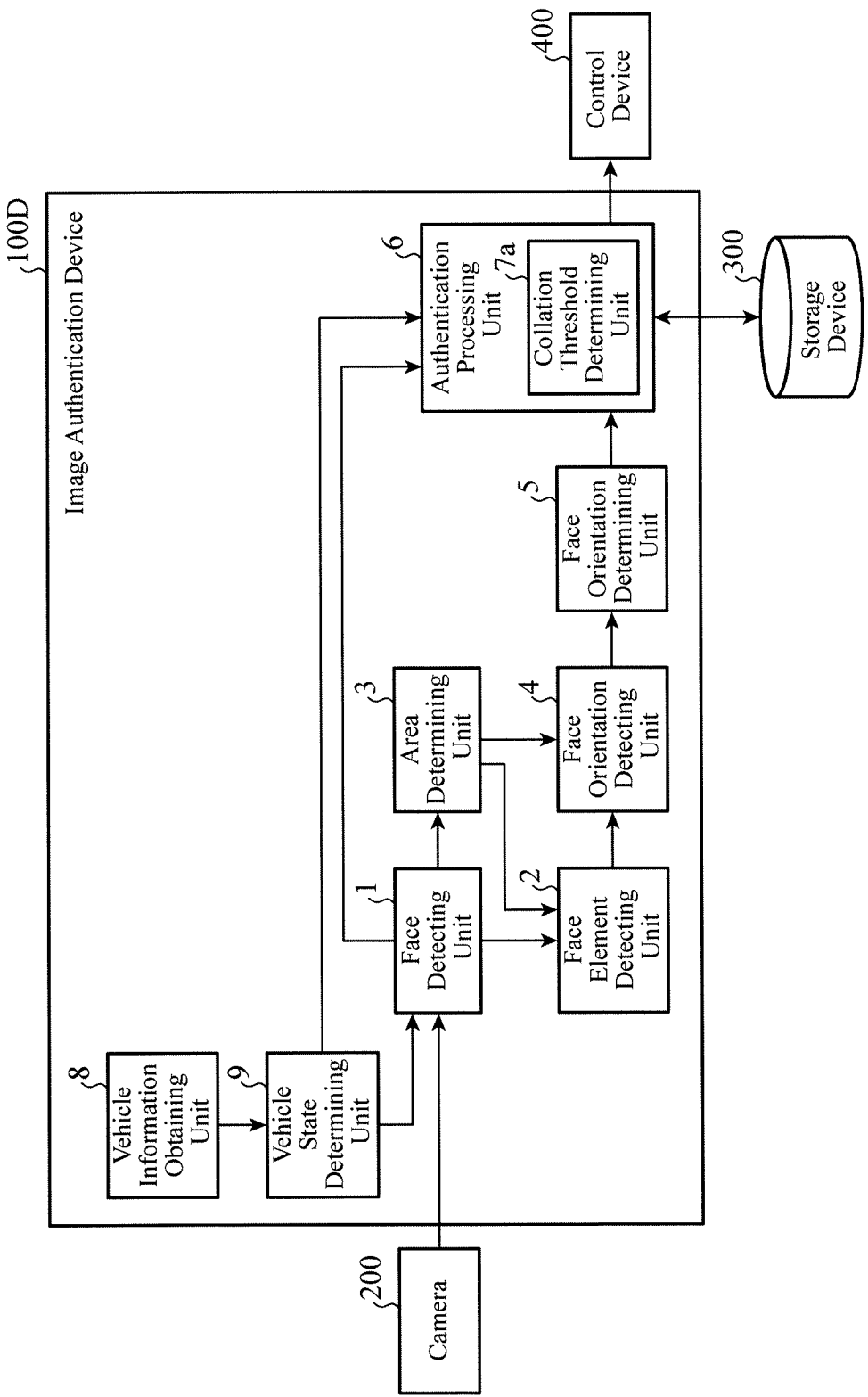
FIG. 15 is a block diagram illustrating a configuration of a vehicle mounted an image authentication device according to a fifth embodiment.

FIG. 15 is a block diagram illustrating a configuration of an image authentication device 100D according to the fifth embodiment.

The image authentication device 100D according to the fifth embodiment is configured by adding a vehicle information obtaining unit 8 and a vehicle state determining unit 9 to an image authentication device 100 described in the first embodiment and further adding a collation threshold determining unit 7a to an authentication processing unit 6.

Hereinafter, the same reference signs as those used in the first, third, and fourth embodiments are assigned to the same or corresponding components as those of image authentication devices 100, 100B, and 100C according to the first, third, and fourth embodiments and the description thereof is omitted or simplified.

The vehicle state determining unit 9 refers to position information of a vehicle input from the vehicle information obtaining unit 8, and when detecting that the vehicle is located at a specific point set in advance, notifies the collation threshold determining unit 7a in the authentication processing unit 6 of the detection together with the position information of the point.

A storage device 300 stores characteristic information of a face of each user, information (for example, an ID) for specifying each user, and the position information of the specific point in association with each other.

When a determination result that face orientation is within an angle range set in advance is input from a face orientation determining unit 5, the collation threshold determining unit 7a refers to the storage device 300 and searches for a user to whom the position information coincident with the position information notified from the vehicle state determining unit 9 is assigned. When searching for the user, the collation threshold determining unit 7a performs a process of setting the collation threshold for the searched user to be lower than a prescribed value.

On the basis of the collation threshold set by the collation threshold determining unit 7a, the authentication processing unit 6 collates characteristic information of a taken image of a face area input from a face detecting unit 1 with characteristic information of a taken image for authentication obtained from the storage device 300, and performs the authenticating process for a person whose image of the face area is taken.

For example, when current position information of the vehicle indicates that the vehicle is located at home of the user who owns the vehicle, it is considered that an occupant sitting on a front seat of the vehicle is often a family of the user who owns the vehicle. Therefore, the vehicle state determining unit 9 refers to the position information of the vehicle, and when detecting that the vehicle is located at home of the user who owns the vehicle as the point set in advance, notifies the collation threshold determining unit 7a of the detection together with the position information of the home. The collation threshold determining unit 7a refers to the storage device 300 to search for the user to whom the position information of the home is assigned, and performs the process of setting the collation threshold for the searched user to be lower than the prescribed value. On the basis of the collation threshold set to be lower by the collation threshold determining unit 7a than the prescribed value, the collation threshold being set for the user who owns the vehicle and the family of the user, the authentication processing unit 6 performs the authenticating process for the person whose image of the face area is taken.

Next, an operation of the image authentication device 100D is described.

Figure 16:
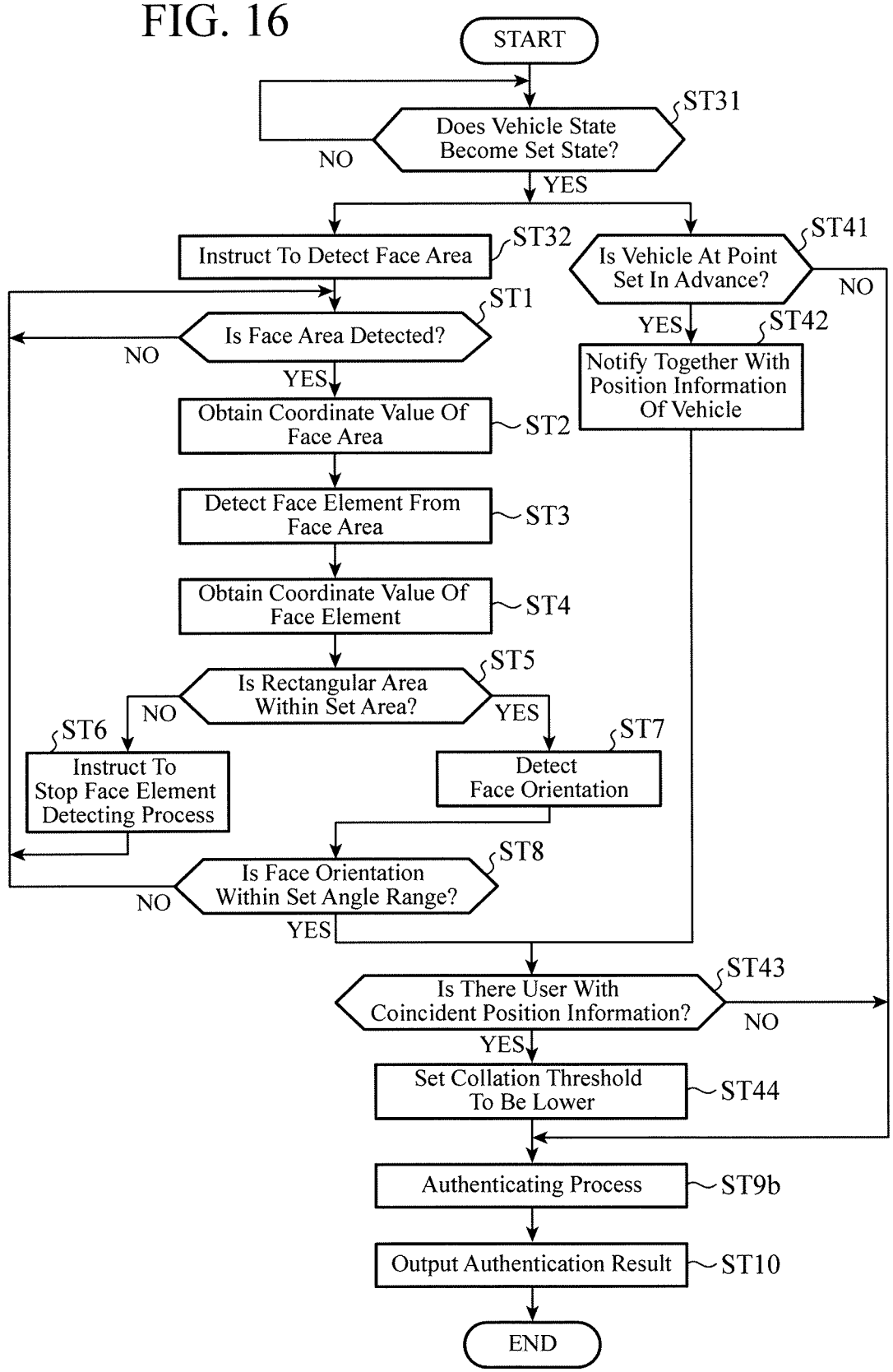
FIG. 16 is a flowchart illustrating an operation of the image authentication device according to the fifth embodiment.

FIG. 16 is a flowchart illustrating the operation of the image authentication device 100 according to the fifth embodiment.

The vehicle state determining unit 9 refers to the vehicle information obtained by the vehicle information obtaining unit 8 and determines whether the vehicle state becomes a state set in advance (step ST31). When the vehicle state does not become the state set in advance (step ST31; NO), the vehicle state determining unit 9 repeats the process at step ST31. On the other hand, when the vehicle state becomes the state set in advance (step ST31; YES), the processing proceeds to a process at step ST32. In parallel with processes at and after step ST32, the vehicle state determining unit 9 refers to the position information of the vehicle obtained by the vehicle information obtaining unit 8 and determines whether the vehicle is located at the specific point set in advance (step ST41).

When the vehicle is not located at the specific point (step ST41; NO), the processing proceeds to step ST9b. On the other hand, when the vehicle is located at the specific point (step ST41; YES), the vehicle state determining unit 9 notifies the collation threshold determining unit 7a in the authentication processing unit 6 that the vehicle is located at the specific point and notifies the same of the position information of the vehicle (step ST42). Thereafter, the processing proceeds to a process at step ST43.

The processes from step ST1 to step ST8 are performed, and when the face orientation is within the set angle range (step ST8; YES), the collation threshold determining unit 7a refers to the storage device 300 and determines whether there is a user to whom the position information coincident with the position information of the vehicle notified at step ST42 is assigned (step ST43). When there is not such a user (step ST43; NO), the processing proceeds to a process at step ST9b. On the other hand, when there is the user (step ST43; YES), the collation threshold determining unit 7a sets the collation threshold for the searched user to be lower than the prescribed value (step ST44). When the collation threshold is set at step ST44, on the basis of the collation threshold, the authentication processing unit 6 collates the characteristic information of the taken image of the face area input from the face detecting unit 1 with the characteristic information of the taken image for authentication registered in the storage device 300, and performs the authenticating process for the person whose image of the face area is taken (step ST9b); then the authentication processing unit 6 outputs an authentication result at step ST9b to the control device 400 (step ST10), and the processing is ended.

When the collation threshold is set to be lower than the prescribed value at step ST9b, the authenticating process is performed by applying the collation threshold set to be lower. Thus, when the vehicle is located at the specific point such as the user's home, the collation threshold for the registered family can be set low, and therefore the family is more likely to be authenticated.

As described above, according to the fifth embodiment, the collation threshold determining unit 7b for determining, on the basis of the determination result by the vehicle state determining unit 9 that the vehicle is located at the specific point, the collation threshold is provided, and the authentication processing unit 6 is configured to collate the characteristic information of the taken image of the face area detected by the face detecting unit 1 with the characteristic information of the taken image for authentication accumulated in advance and authenticate the person on the basis of whether the collation result is equal to or larger than the collation threshold, and the collation threshold determining unit 7b is configured to determine, on the basis of the determination result by the vehicle state determining unit 9 that the vehicle is located at the specific point, the collation threshold, so that it is possible to alleviate the condition when performing the authenticating process, when the vehicle is located at the specific point.

Note that, although the configuration obtained by adding the collation threshold determining unit 7a, the vehicle information obtaining unit 8, and the vehicle state determining unit 9 to the image authentication device 100 described in the first embodiment is described in the above-described fifth embodiment, it is also possible to add the vehicle information obtaining unit 8 and the vehicle state determining unit 9 to the image authentication device 100B described in the third embodiment and add the function of the collation threshold determining unit 7a to the collation threshold determining unit 7.

Other than the above-description, in the present invention, the embodiments may be freely combined, any component of each embodiment may be modified, or any component may be omitted in each embodiment, without departing from the scope of the invention.

INDUSTRIAL APPLICABILITY

Since the image authentication device according to the present invention can extract the face image of the person to be authenticated from the taken image in which the face of the person to be authenticated and the face of the person other than the person to be authenticated are imaged and authenticate, this is suitable to be used in the vehicle or the like which is controlled for each user and used for improving authentication accuracy of the user.

REFERENCE SIGNS LIST

1 Face detecting unit
2 Face element detecting unit
3 Area determining unit
4 Face orientation detecting unit
5 Face orientation determining unit
5a Eye opening determining unit
6 Authentication processing unit
6a Termination determining unit
7, 7a Collation threshold determining unit
8 Vehicle information obtaining unit
9 Vehicle state determining unit
100, 100A, 100B, 100C, 100D Image authentication device
200 Camera
300 Storage device
400 Control device
500 Vehicle
501 Driver seat
502 Passenger seat
503, 504 Occupant

The invention claimed is:

1. An image authentication device comprising:
a processor to execute a program; and
a memory to store the program which, when executed by the processor, performs processes of,
detecting a face area in which a face of a person is located and characteristic information of the face area from a taken image in which an imaging range in which an occupant sitting on a driver seat and an occupant sitting on a passenger seat in a vehicle are able to be simultaneously imaged is imaged;
determining whether the face area detected is located within an area set partially in the imaging range for authenticating each of the occupants sitting on a front seat of the vehicle; and
when it is determined that the face area is located within the set area, collating the characteristic information of the taken image of the face area with characteristic information of a taken image for authentication accumulated in advance and authenticating the person whose face area is detected.

2. The image authentication device according to claim 1, wherein the processes include:
when the person whose face area is detected cannot be authenticated, instructing to detect the face area again on a basis of a vehicle speed of the vehicle.

3. The image authentication device according to claim 1, wherein the set area is set inside the vehicle than a pillar of the vehicle imaged in the take image.

4. The image authentication device according to claim 1, wherein the set area is set on a side of each of the driver seat and the passenger seat in the vehicle.

5. The image authentication device according to claim 1, wherein the processes include:
detecting an element of the face of the period from the taken image of the face area detected,
detecting orientation of the face of the person on a basis of position information in the taken image of the element of the face of the person detected,
determining whether the orientation of the face of the person detected is within a range of face orientation set for authenticating each of the occupants sitting on the front seat of the vehicle, and
when it is determined that the face area is located within the set area and that the orientation of the face of the person is within the set range of the face orientation, collating the characteristic information of the taken image of the face area with the characteristic information of the taken image for authentication accumulated in advance and authenticating the person whose face area is detected.

6. The image authentication device according to claim 1, wherein the processes include:
detecting an element of the face of the person from the taken image of the face area detected,
determining whether eyes of the person are open on the basis of the position information in the taken image of the element of the face of the person detected, and
when it is determined that the face area is located within the set area and that the eyes of the person are open, collating the characteristic information of the taken image of the face area with the characteristic information of the taken image for authentication accumulated in advance and authenticating the person whose face area is detected.

7. The image authentication device according to claim 1, wherein the processes include:
   detecting an element of the face of the person from the taken image of the face area detected,
   detecting orientation of the face of the person on a basis of position information in the taken image of the element of the face of the person detected,
   determining whether the orientation of the face of the person detected is within a range of face orientation set for authenticating each of the occupants sitting on the front seat of the vehicle,
   determining whether eyes of the person are open on the basis of the position information in the taken image of the element of the face of the person, and
   when it is determined that the face area is located within the set area, that the orientation of the face of the person is within the set range of the face orientation and that the eyes of the person are open, collating the characteristic information of the taken image of the face area with the characteristic information of the taken image for authentication accumulated in advance and authenticating the person whose face area is detected.

8. An automobile comprising:
   the image authentication device according to claim 1; and
   a control device to control an acoustic condition of an acoustic device provided for a seat of the vehicle or the vehicle, on a basis of an authentication result input from the image authentication device.

9. The image authentication device according to claim 1, wherein the processes include:
   instructing to detect the face area on a basis of vehicle information of the vehicle.

10. The image authentication device according to claim 9, wherein the vehicle information is information indicating opening and closing of a door of the vehicle.

11. The image authentication device according to claim 9, wherein the processes include:
    on a basis of a determination result that the vehicle is located at a specific point, determining a collation threshold for the person associated with the specific point, and
    collating the characteristic information of the taken image of the face area detected with the characteristic information of the taken image for authentication accumulated in advance and authenticating the person on a basis of whether a collation result is equal to or larger than the collation threshold determined.

12. The image authentication device according to claim 9, wherein the set area is an area set depending on a type of the vehicle information referred to.

13. An image authentication method including:
    detecting a face area in which a face of a person is located and characteristic information of the face area from a taken image in which an imaging range in which an occupant sitting on a driver seat and an occupant sitting on a passenger seat in a vehicle are able to be simultaneously imaged is imaged;
    determining whether the face area detected is located within an area set partially in the imaging range for authenticating each of the occupants sitting on a front seat of the vehicle; and
    when it is determined that the face area is located within the set area, collating the characteristic information of the taken image of the face area with characteristic information of a taken image for authentication accumulated in advance and authenticating the person whose face area is detected.

* * * * *